United States Patent
Naka et al.

(10) Patent No.: US 10,255,811 B2
(45) Date of Patent: Apr. 9, 2019

(54) OBSTACLE AVOIDANCE SYSTEM

(71) Applicant: HITACHI CONSTRUCTION MACHINERY CO., LTD., Tokyo (JP)

(72) Inventors: Takuya Naka, Tokyo (JP); Masaki Kanai, Tokyo (JP); Takayuki Satou, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 111 days.

(21) Appl. No.: 15/502,299

(22) PCT Filed: Mar. 6, 2015

(86) PCT No.: PCT/JP2015/056702
§ 371 (c)(1),
(2) Date: Feb. 7, 2017

(87) PCT Pub. No.: WO2016/051818
PCT Pub. Date: Apr. 7, 2016

(65) Prior Publication Data
US 2017/0236422 A1  Aug. 17, 2017

(30) Foreign Application Priority Data

Sep. 29, 2014 (JP) .................................. 2014-199463

(51) Int. Cl.
*G08G 1/16* (2006.01)
*B60W 30/09* (2012.01)
(Continued)

(52) U.S. Cl.
CPC ............. *G08G 1/165* (2013.01); *B60W 30/09* (2013.01); *B60W 30/12* (2013.01);
(Continued)

(58) Field of Classification Search
CPC .......... G08G 1/165; G08G 1/16; G08G 1/166; B60W 30/09; B60W 30/12; B60W 40/04;
(Continued)

(56) References Cited

U.S. PATENT DOCUMENTS

2008/0189040 A1* 8/2008 Nasu ...................... G08G 1/163
701/301

FOREIGN PATENT DOCUMENTS

JP       62-274312 A    11/1987
JP     2005-107917 A     4/2005
(Continued)

OTHER PUBLICATIONS

EPO English translation of JP-2005107917-A.*
International Search Report of PCT/JP2015/056702 dated May 26, 2015.

*Primary Examiner* — Yazan A Soofi
(74) *Attorney, Agent, or Firm* — Mattingly & Malur, PC

(57) ABSTRACT

On a basis of a relative position of an obstacle 401, a size of the obstacle in an own vehicle 12 width direction and a width of the own vehicle 12, a maximum amount $D_t$ of movement of the own vehicle 12 in the vehicle width direction as required to avoid the obstacle 401 is calculated. A point displaced over the maximum amount of movement toward a side of the adjacent lane from the relative position of the obstacle 401 is determined as an avoiding point 250. If a distance d between the avoiding point 250 and the adjacent lane is greater than the width Wm of the own vehicle 12, an avoiding path is generated for allowing the own vehicle 12 to pass the avoiding point 250.

8 Claims, 16 Drawing Sheets

(51) Int. Cl.
  *B60W 30/12* (2006.01)
  *B60W 40/04* (2006.01)
  *B62D 15/02* (2006.01)
  *G01C 21/34* (2006.01)
  *G01S 5/00* (2006.01)
  *G01S 13/93* (2006.01)
  *G01S 17/02* (2006.01)
  *G01S 17/93* (2006.01)
  *G05D 1/02* (2006.01)
  *G08G 1/00* (2006.01)
  *B60W 30/18* (2012.01)
  *G01S 19/13* (2010.01)

(52) U.S. Cl.
  CPC ....... *B60W 30/18163* (2013.01); *B62D 15/02* (2013.01); *B62D 15/0265* (2013.01); *G01C 21/3407* (2013.01); *G01S 5/0072* (2013.01); *G01S 13/931* (2013.01); *G01S 17/023* (2013.01); *G01S 17/936* (2013.01); *G05D 1/0257* (2013.01); *G05D 1/0274* (2013.01); *G05D 1/0297* (2013.01); *G08G 1/16* (2013.01); *G08G 1/166* (2013.01); *G08G 1/207* (2013.01); *B60W 2550/10* (2013.01); *G01S 19/13* (2013.01); *G05D 2201/021* (2013.01)

(58) Field of Classification Search
  CPC ................ B62D 15/02; B62D 15/0265; G01C 21/3407; G01S 13/931; G01S 17/023; G01S 17/936; G05D 1/0257; G05D 1/0274; G05D 1/297
  USPC ....................................................... 701/301
  See application file for complete search history.

(56) References Cited

FOREIGN PATENT DOCUMENTS

| | | | |
|---|---|---|---|
| JP | 2005107917 A | * | 4/2005 |
| JP | 2007-164280 A | | 6/2007 |
| JP | 2011-051547 A | | 3/2011 |
| JP | 2011-107793 A | | 6/2011 |

* cited by examiner

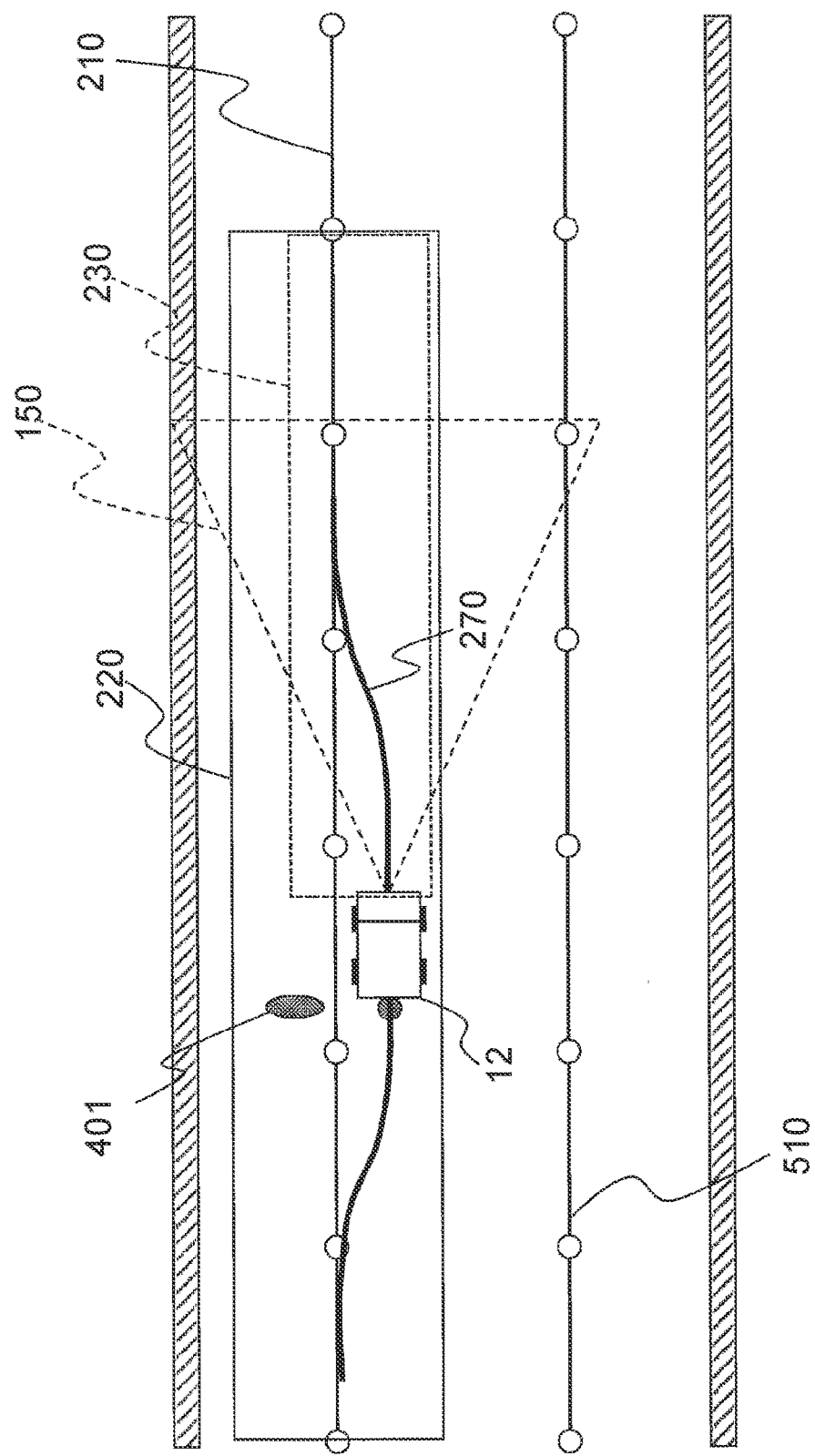

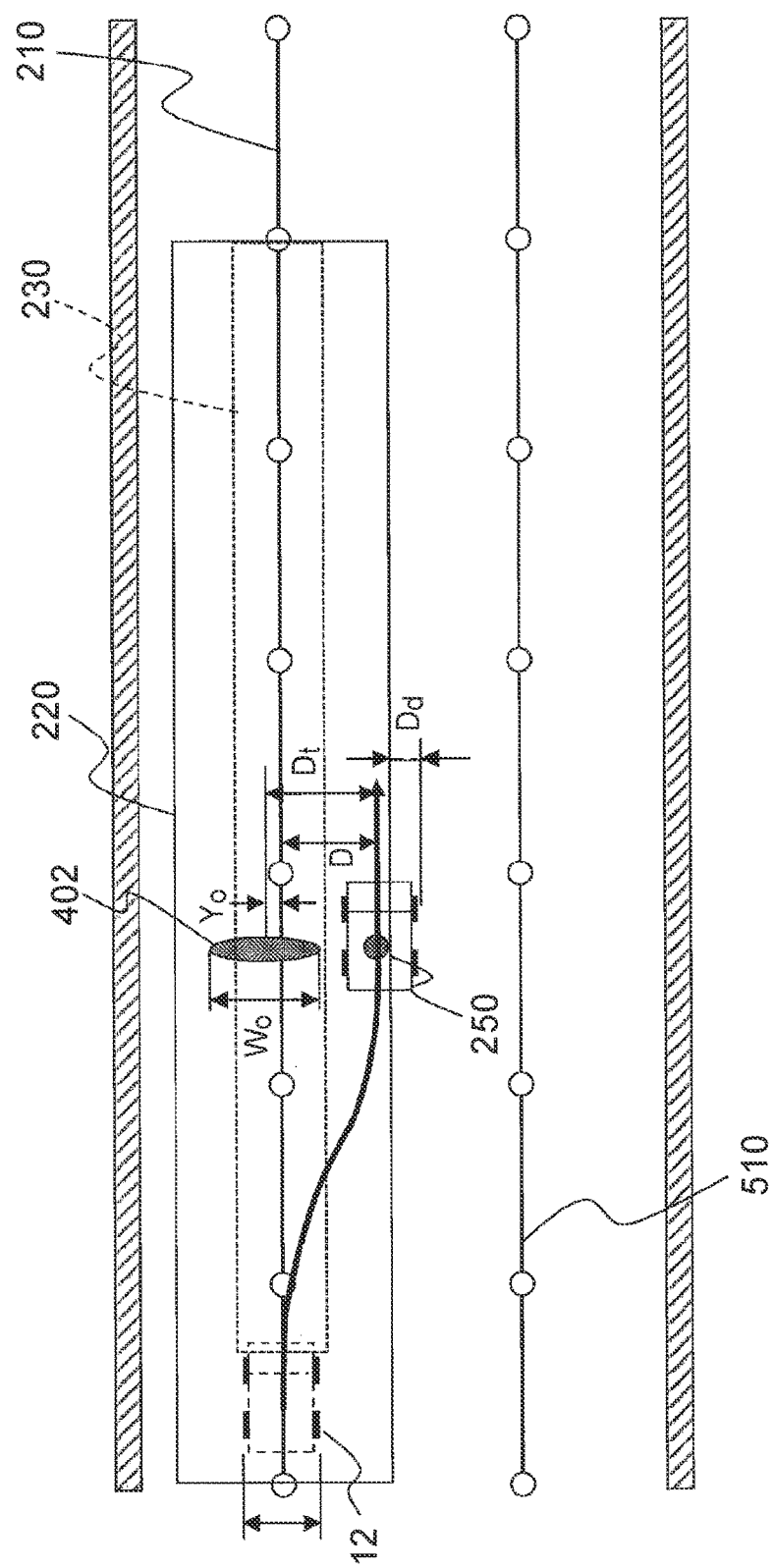

OBSTACLE AVOIDANCE SYSTEM

TECHNICAL FIELD

This invention relates to an obstacle avoidance system, and especially to an avoidance system for an obstacle on a haul road with plural lanes included therein.

BACKGROUND ART

There is known an autonomous travel system that connects autonomously-traveling haulage vehicles (hereinafter called "unmanned dump trucks"), which can perform autonomous traveling without operators onboard, for communications with a traffic control system via a wireless communication network in an surface mine or the like. In a mining environment, unmanned dump trucks, graders and bulldozers are operated together with vehicles driven by operators (hereinafter called "manned vehicles") such as light vehicles (for supervision or transportation of employees, etc.) and sprinkler vehicles. The traveling positions and operation conditions of these unmanned dump trucks, graders, bulldozers and manned vehicles are controlled by an autonomous travel system, and are subjected to traffic control on the basis of map data, which have been created beforehand, and the traveling positions so that these vehicles do not interfere with each other.

On a travel road, an obstacle other than those to be subjected to traffic control, such as a fallen rock or an object fallen on the travel road, may exist. As a technology for avoiding such an obstacle, Patent Document 1, for example, discloses the following technology: "To perform precise cooperative control between automatic brake control and steering assist control, the automatic brake control is performed if the relative position of an obstacle, which exists ahead of an own vehicle, to the own vehicle as detected by a relative position detecting means for detecting the relative positions of the own vehicle and the obstacle is in a first region ahead of the own vehicle, and the steering assist control is performed if the detected relative position of the obstacle exists in a second region that is located outside the first region and is broad in a vehicle width direction" (see the Abstract).

PRIOR ART DOCUMENT

Patent Document

Patent Document 1: JP-A-2011-51547

Disclosure of the Invention

Problem to be Solved by the Invention

In Patent Document 1, however, an operation is performed for the avoidance of the obstacle on the basis of only the positional relation with the obstacle ahead of the own vehicle, which is detectable by a sensor such as a radar mounted on the vehicle. There is, accordingly, a potential problem that a determination to permit avoidance steering to an oncoming lane may be made, for example, even when there is a vehicle traveling from a distance in the oncoming lane. Depending on the positional relation with the oncoming vehicle and the amount of stick-out to the oncoming lane, a danger of contact with the oncoming vehicle may arise or, even if such contact does not take place, another problem may arise that the efficiency of hauling work would be lowered due to an unplanned deceleration or the like. No consideration is made about such a danger or problem in Patent Document 1.

With the foregoing circumstances in view, it is an object of the present invention to safely and efficiently avoid an obstacle on a travel road without interfering with the traveling of a vehicle in an adjacent lane provided in parallel with a travel lane of the own vehicle upon avoiding the obstacle on the travel road.

Means for Solving the Problem

To achieve the above-described object, the present invention is characterized in that in an obstacle avoidance system for allowing an own vehicle, which is in a travel lane with an adjacent lane provided in parallel with the travel lane, to avoid an obstacle, which is located ahead in the travel lane, by passing the obstacle on a side of the adjacent lane, the obstacle avoidance system includes an obstacle detection unit configured to detect, on a basis of an output from an environmental sensor mounted on the own vehicle, a relative position of the obstacle with respect to the own vehicle as a reference and a size of the obstacle in a vehicle width direction, a movement amount calculation unit configured to calculate, on a basis of the relative position of the obstacle, the size of the obstacle in the vehicle width direction and a width of the own vehicle, a maximum amount of movement of the own vehicle in the vehicle width direction as required to avoid the obstacle, and an avoiding path generation unit configured to determine, as an avoiding point, a point displaced over the maximum amount of movement toward the side of the adjacent lane from the relative position of the obstacle and, if a distance between the avoiding point and a center line of the adjacent lane is greater than the width of the own vehicle, to generate an avoiding path for allowing the own vehicle to pass through the avoiding point.

Advantageous Effects of the Invention

According to the present invention, an own vehicle can safely and efficiently avoid an obstacle on a travel road without interfering with the traveling of a vehicle in an adjacent lane provided in parallel with a travel lane of the own vehicle upon avoiding the obstacle on the travel road. Objects, configurations and advantageous effects other than those described above will become apparent from the following description of embodiments.

BRIEF DESCRIPTION OF THE DRAWINGS

FIGS. 8A and 8B are diagrams illustrating a case that an obstacle exists in an advancing region of the unmanned vehicle and can be avoided in a travel-permitted region, in which FIG. 8A is an overall diagram and FIG. 8B is an enlarged diagram of surroundings of the vehicle.

FIG. 9 is a diagram illustrating how a path is generated to return to a travel path after an obstacle avoidance action in the case of FIGS. 8A and 8B.

FIG. 10 is a diagram illustrating a case that an obstacle exists in an advancing region of the unmanned dump truck and the dump truck has to depart from a travel-permitted region.

MODES FOR CARRYING OUT THE INVENTION

Embodiments of the present invention will hereinafter be described using the drawings. In the following embodiments, a description will be made by dividing each embodiment into plural sections or embodiments wherever needed for the sake of convenience. When the numbers of elements and the like (including the numbers of parts or components, numerical values, amounts, ranges, and so on) are referred to in the following embodiments, they shall not be limited to any specific numbers and may be greater or smaller than such specific numbers unless specifically indicated or unless apparently limited to such specific numbers in principle. In the following embodiments, their constituent elements (including processing steps and the like) are not absolutely essential unless specifically indicated or unless clearly considered to be essential in principle.

Further, the individual configurations, functions, processing units, processing means and the like in the following embodiments may be partly or wholly realized, for example, as integrated circuits or other hardware. Alternatively, the below-described individual configurations, functions, processing units, processing means and the like may be realized as programs to be executed on a computer, in other words, may be realized as software. Information on programs, tables, files and the like, which realize the individual configurations, functions, processing units, processing means and the like, can be stored in storage devices such as memories, hard disks or SSDs (solid state drives) or the like or storage media such as IC cards, SD cards or DVDs.

It is to be noted that throughout the drawings that show or illustrate the embodiments, members having the same functions are identified by the same or related designations, and their repeated descriptions will be omitted.

In each of the following embodiments, a description will be made about an obstacle avoidance system for allowing an own vehicle, which is in a travel lane with an adjacent lane provided in parallel with the travel lane, to avoid an obstacle, which is located ahead in the travel lane, by passing the obstacle on a side of the adjacent lane. Each embodiment will be described by taking, as an example, a case that the adjacent lane is an oncoming lane. However, the adjacent lane may be a lane (parallel travel lane) on a haul road including two or more lanes in each direction. The travel lane and adjacent lane may be adjacent to each other, or these two lanes may be provided apart from each other.

First Embodiment

Figure 1:
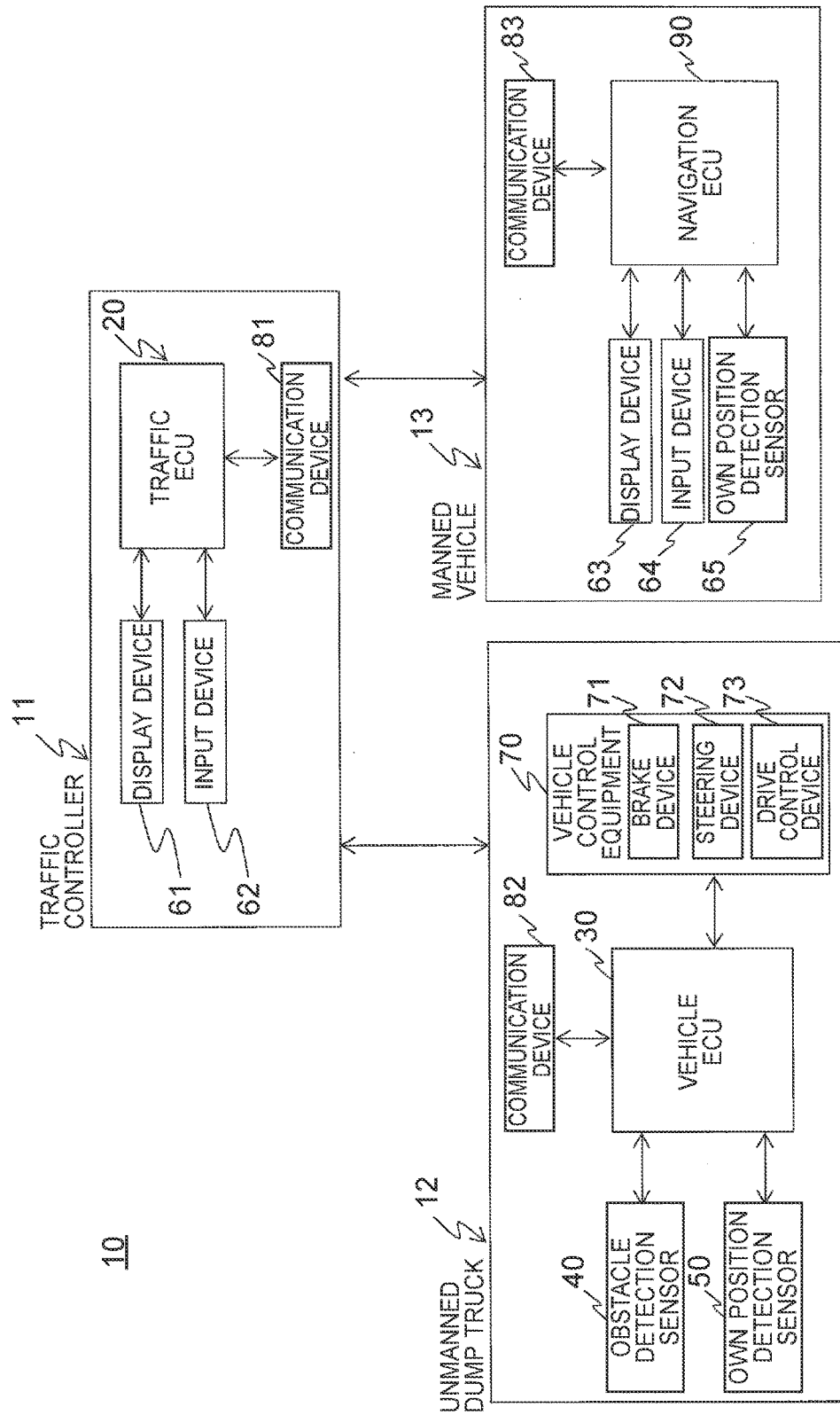
FIG. 1 is a schematic diagram illustrating the configuration of an obstacle avoidance system.
Figure 2:
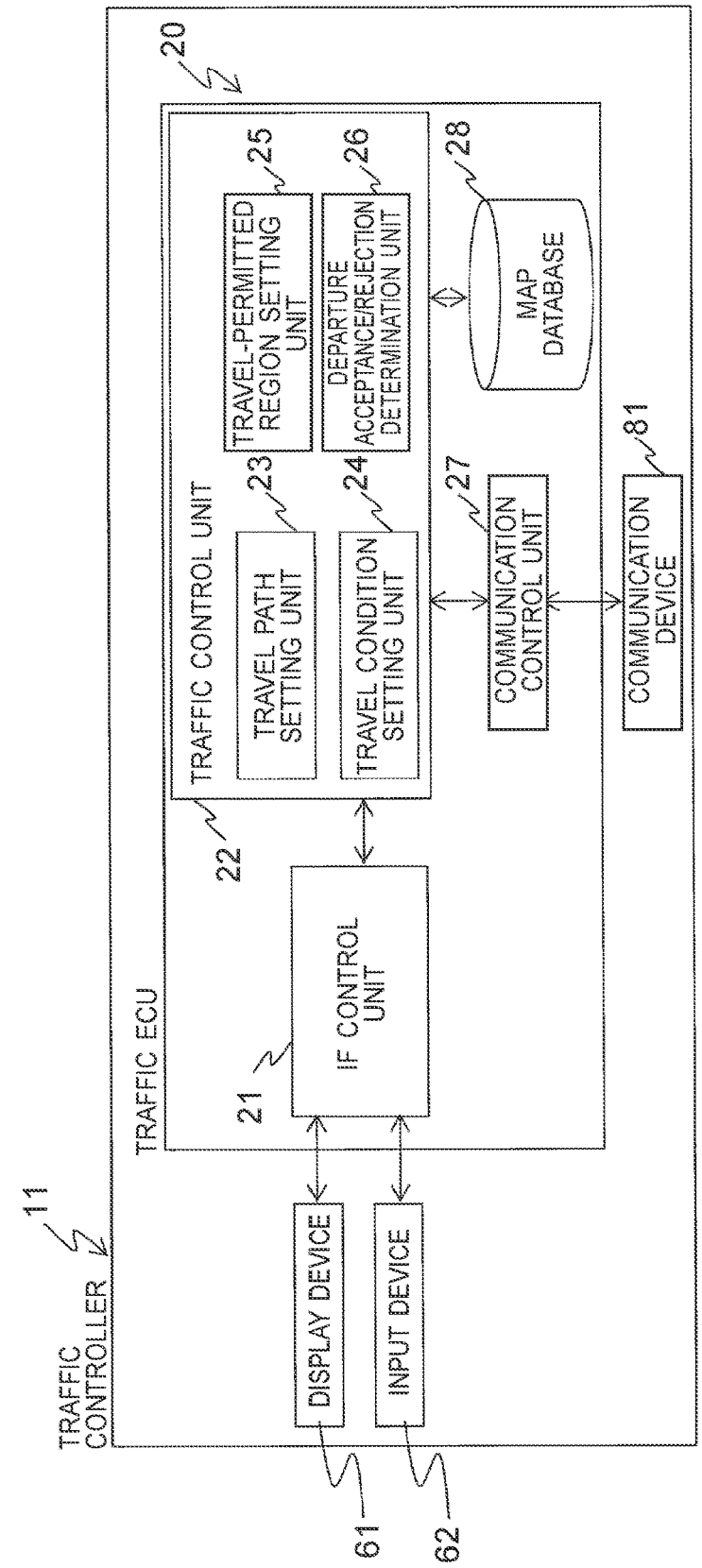
FIG. 2 is a block diagram illustrating the configuration of a traffic control subsystem.
Figure 3:
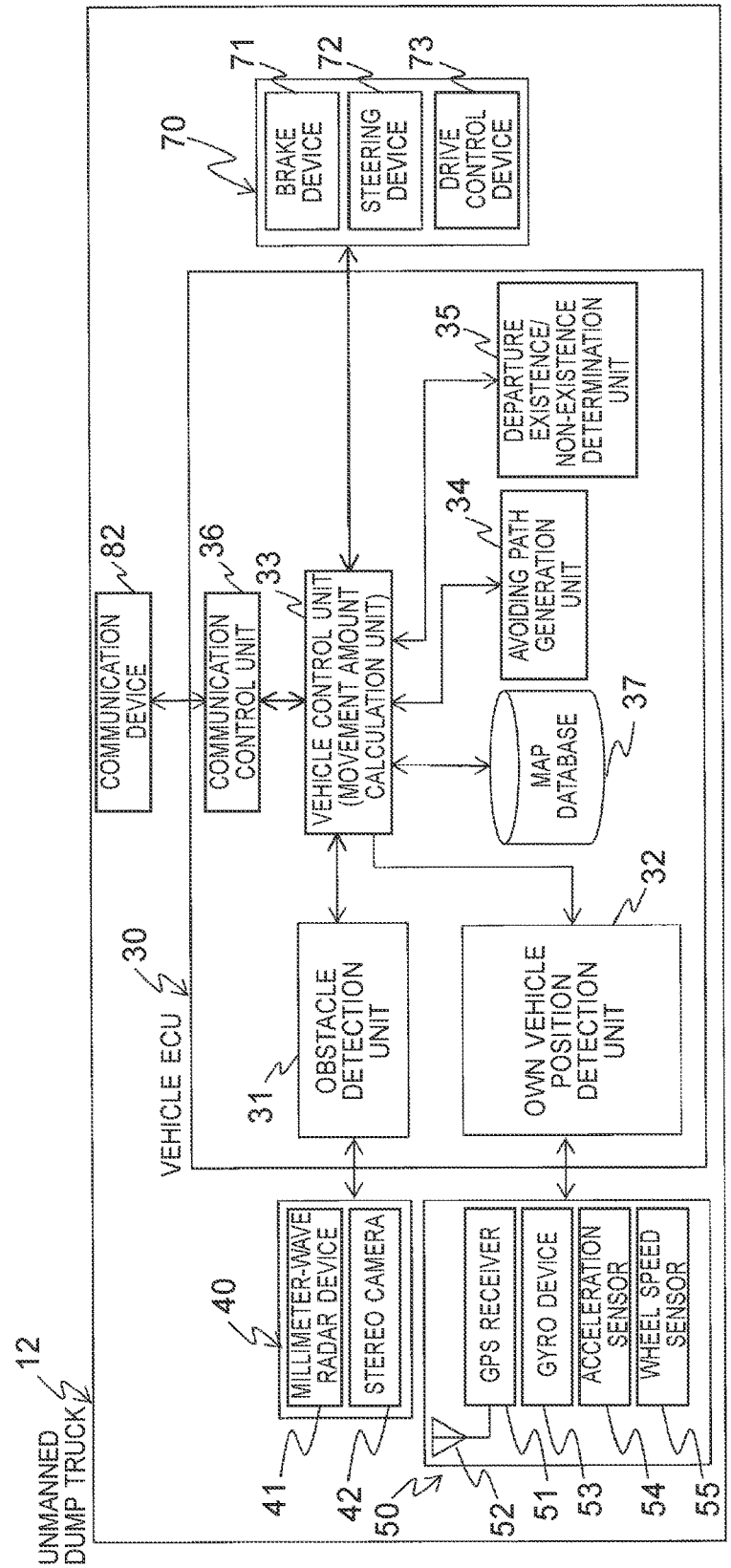
FIG. 3 is a block diagram illustrating the configuration of an unmanned dump truck.
Figure 4:
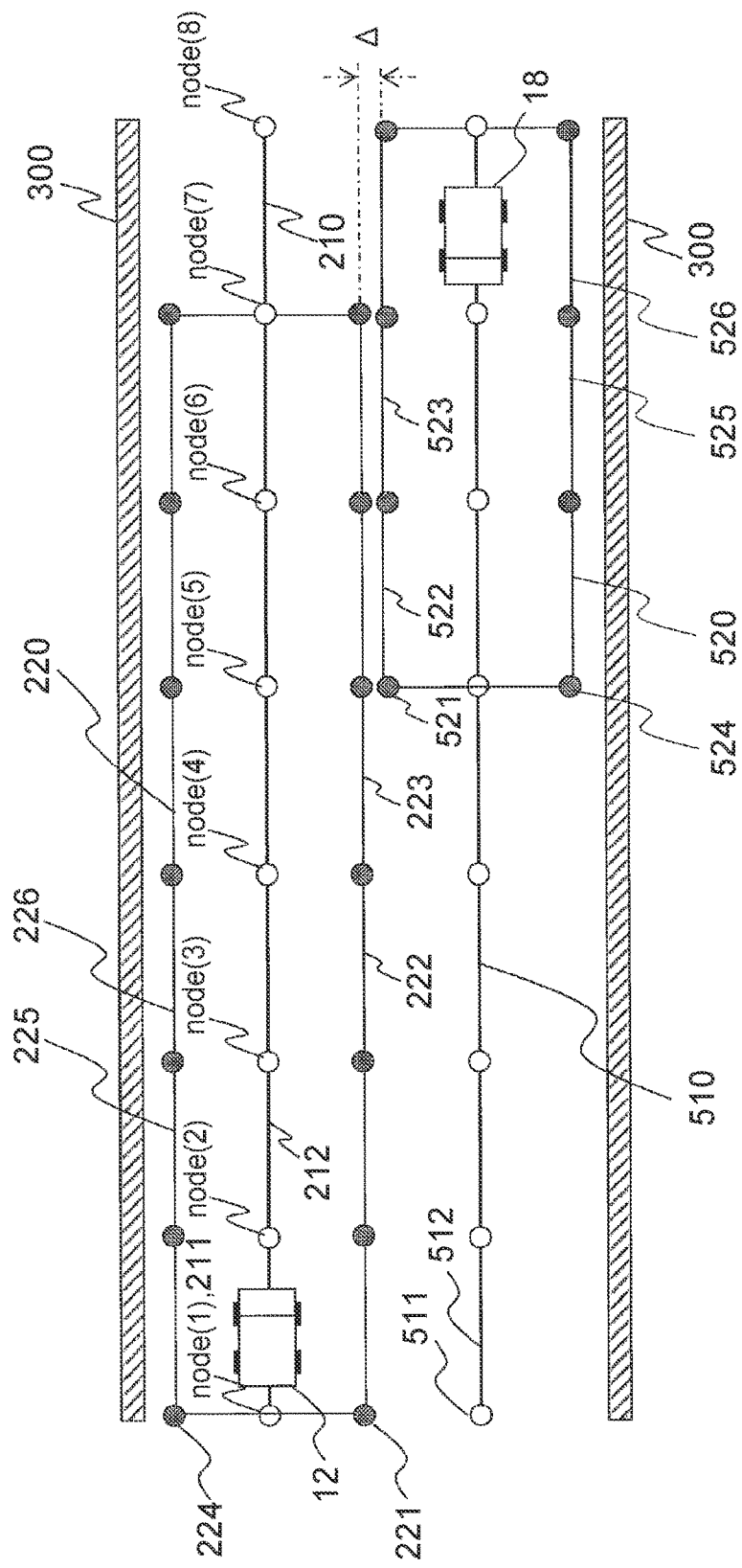
FIG. 4 is a diagram showing illustrative map information of an approach lane and a return lane in a first embodiment.

With reference to FIGS. 1 through 4, a description will be made about the schematic configuration of an obstacle avoidance system 10 according to this embodiment. FIG. 1 is a schematic diagram illustrating the configuration of an obstacle avoidance system. FIG. 2 is a block diagram illustrating the configuration of a traffic control system shown in FIG. 1. FIG. 3 is a block diagram illustrating the configuration of an unmanned dump truck shown in FIG. 1. FIG. 4 is a diagram showing illustrative map information of an approach lane and a return lane in the first embodiment.

As illustrated in FIG. 1, the obstacle avoidance system 10 according to this embodiment is configured of a traffic controller 11 and an own vehicle 12 and a manned vehicle 13, which are respectively connected for wireless communications to the traffic controller 11.

The traffic controller 11 is configured to control work contents and traveling positions and conditions with respect to each of the own vehicle 12 and manned vehicle 13 which perform work at a working site such as a mine, and also to assume a role to instruct the own vehicle 12 and manned vehicle 13 actions to be taken in accordance with a work schedule at the working site.

The traffic controller 11 includes four devices consisting of a traffic ECU (Electronic Control Unit) 20, a display device 61, an input device 62 and a communication device 81, and is configured of the traffic ECU 20 and the display device 61, input device 62 and communication device 81 electrically connected together, respectively.

The traffic ECU 20 is an electronic control unit (ECU) having various function means to be realized through execution, by CPU (Central Processing Unit), of programs stored in a memory. As illustrated in FIG. 2, the traffic ECU 20 includes an IF control unit 21, a traffic control unit 22, a communication control unit 27, and a map database 28 (which corresponds to the map information storage unit). The IF control unit 21 control the input and output of information between the display device 61 and the input device 62, the traffic control unit 22 sets travel paths, travel-permitted regions, travel conditions and the like for the own vehicle 12 and manned vehicle 13, the communication control unit 27 controls the input and output of wireless information to and from the communication device 81, and the map database 28 stores information of travel paths and travel-permitted regions at the working site.

As map information to be stored in the map database 28, the first embodiment employs two-dimensional map information, which includes plural points (nodes) arrayed along the travel direction of each lane, a target trajectory (the center line of the lane) defined by links connecting the adjacent ones of the nodes, and width information along the width direction of a traveling vehicle with the target trajectory serving as a center. Details of the map information will be described subsequently herein with reference to FIG. 4.

The traffic control unit 22 has a travel path setting unit 23, a travel condition setting unit 24, a travel-permitted region setting unit 25 and a departure acceptance/rejection determination unit 26 to set a travel path and travel-permitted region of each of all unmanned vehicles 12 and manned vehicles 13 which work at the mining site.

The travel path setting unit 23 is configured to determine a destination for each vehicle and to set a travel path to the destination, with reference to the travel path for the own vehicle, the map information of an oncoming lane (adjacent lane) and the current positions of the own vehicle 12 and manned vehicle 13, all of which are stored in the map database 28.

The travel condition setting unit 24 is configured to set, for each vehicle, travel conditions such as a maximum speed, a maximum acceleration and the like for the vehicle on the travel path, on the basis of speed limits and curvatures of the respective lanes, waiting times to a loading position, and the like as defined in relation to the map information.

The travel-permitted region setting unit 25 is configured, with reference to the map information of the travel lanes, to set for each vehicle a travel-permitted region where only the vehicle is permitted to travel and the other vehicle is prohibited to enter there. In other words, the travel-permitted region setting unit 25 is configured to set, on the travel path set for each vehicle, a partial region, where the vehicle is permitted to travel, as a travel-permitted region. Each vehicle can travel in the travel-permitted region (which corresponds to the first travel-permitted region) set for the own vehicle, but is not permitted to depart from the travel-permitted region by its own discretion. Further, the other vehicle cannot enter the travel-permitted region set for the own vehicle, and the own vehicle cannot enter the travel-permitted region set for the other vehicle.

As the two-dimensional map information is employed in the first embodiment, the travel-permitted region setting unit 25 is configured to set the first travel-permitted region by employing a two-dimensional region defined by a length along the target trajectory in the travel lane and the width of the own vehicle in the vehicle width direction with the target trajectory in the travel lane serving as the center. The travel-permitted region setting unit 25 is also configured, when the other vehicle travels in the adjacent lane, to set a second travel-permitted region, where only the other vehicle is permitted to travel, for the other vehicle with reference to the map information of the adjacent lane by employing a two-dimensional region defined by a length along the target trajectory in the adjacent lane and the width of the other vehicle in the vehicle width direction with the target trajectory in the adjacent lane serving as the center.

The departure acceptance/rejection determination unit 26 is configured, when the own vehicle is determined to depart from the first travel-permitted region if an obstacle avoidance action is taken, to determine, on the basis of at least one of the position of the other vehicle and the position of the travel-permitted region (second travel-permitted region) set for the other vehicle, whether to allow the own vehicle to depart from the first travel-permitted region.

The travel paths and travel-permitted regions will be described using FIG. 4. FIG. 4 shows a scene that the own vehicle 12 and another vehicle 18 are traveling on a haul road at a mining site. The haul road consists of two lanes, one being an approach lane and the other a return lane. In FIG. 4, the own vehicle 12 is traveling toward the right side on the paper sheet of FIG. 4, while the another vehicle 18 is traveling toward the left side. Map information of each lane is defined using plural nodes (unfilled circles) arrayed in the travel direction, a target trajectory formed from links connecting the adjacent ones of the nodes, and left and right boundary lines of the target trajectory.

In FIG. 4, a target trajectory 210 is defined using nodes 211 and links 212 in the map information of the travel lane for the own vehicle 12. A right boundary line 223, which is located on a right side of the travel lane as viewed in an advancing direction, is defined using nodes 221 and links 222, and similarly a left boundary line 226, which is located on a left side of the travel lane as viewed in the advancing direction, is defined using nodes 224 and links 225. As the terms "right boundary line" and "left boundary line", lane boundary lines located on left and right sides, respectively, of the associated lane with respect to a target trajectory as a center as viewed in an advancing direction will hereinafter be called "right boundary line" and "left boundary line", irrespective of a parallel lane or an oncoming lane. Similarly, the map information of the oncoming lane includes a target trajectory 510 consisting of nodes 511 and links 512, a right boundary line 523 defined using nodes 521 and links 522, and a left boundary line 526 defined using nodes 524 and links 525.

In FIG. 4, travel-permitted regions 220,520 are set for the own vehicle 12 and the another vehicle 18, respectively. Between the travel-permitted regions 220 and 520, a safety margin distance $\Delta$ is provided to avoid an interference between the own vehicle 12 and the another vehicle 18. Numeral 300 indicates shoulders provided along opposite side edges of the haul road.

The travel path setting unit 23 is configured to set a travel path for each vehicle by using the combination of all the nodes 211 and links 212 or the combination of all the nodes 511 and links 512 from the current point to the destination.

If the own vehicle 12 should need to depart from the first travel-permitted region 220 for taking an obstacle avoidance action during traveling, the own vehicle 12 requests for acceptance of a departure to the traffic control unit 22. The traffic control unit 22, which has been requested to accept the departure, determines the acceptance or rejection of the departure from the first travel-permitted region 220 of the own vehicle 12 depending on the state of setting of the second travel-permitted region 520 of the another vehicle 18. If the departure is accepted, a new first travel-permitted region of the own vehicle 12 is set at the travel-permitted region setting unit 25.

In FIG. 4, the own vehicle 12 is allowed to travel to the node (7) along a travel path defined by the seven nodes of from the node (1) to the node (7) in the first travel-permitted region 220. Before arriving at the node (7), the own vehicle 12 makes inquiry to the traffic control unit 22 whether it can travel a travel path beyond the node (8). Depending on the state of setting of the second travel-permitted region 520 for the another vehicle, the traffic control unit 22 sets a travel-permitted region of the own vehicle 12 with respect to the travel path beyond the node (8). By repeating this procedure up to the destination, the own vehicle 12 is allowed to safely travel to the destination without contact to the another vehicle 18.

Referring back to FIG. 1, the display device 61 is a user interface for displaying travel-permitted regions and travel paths allotted to the own vehicle 12 and manned vehicle 13 and controlled by the traffic controller 11, travel speeds, current positions, and the like to an operator, and is configured, for example, of LCD (liquid crystal display).

The input device 62 is another user interface for allowing the operator to perform an input operation for giving an instruction to the traffic controller 11 when the contents to be displayed at the display device 61 are switched or work contents are changed for a specific vehicle, and is configured, for example, of a keyboard and a mouse, a touch panel, or a trackball.

The communication device 81 is a device, which for controlling the own vehicle 12 and manned vehicle 13 at the traffic controller 11, is used to receive information such as traveling positions and traveling speeds, the states of the vehicles, and the like and to notify travel instructions such as travel paths, travel conditions and travel-permitted regions to the own vehicle 12 and manned vehicle 13. As the working site extends over a wire area, communications that use wireless technologies are used in general.

A description will next be made about the configuration of an unmanned dump truck. The own vehicle 12 includes at least one of obstacle detection sensor 40 (which corresponds to the environmental sensor), an own vehicle position detection sensor 50, a vehicle ECU 30, a communication device 82, and vehicle control equipment 70, all of which are mounted on the own vehicle 12. The own vehicle 12 is configured of the vehicle ECU 30 and the obstacle detection sensor 40, own vehicle position detection sensor 50, communication device 82 and vehicle control equipment 70 electrically connected, respectively.

The obstacle detection sensor 40 is a sensor for detecting an obstacle on the travel road for the unmanned vehicle 12. The obstacle detection sensor 40 is configured using the sensor that can detect an obstacle, which blocks the unmanned vehicle 12 to travel, such as a fallen rock or a hole or bump on a travel road surface, but is not controlled by the traffic controller 11. It is possible to use, for example, a laser sensor and/or a millimeter-wave radar 41 (see FIG. 3) that detects a distance to a reflecting object by measuring a time from the emission of a laser beam until the return of a reflected beam, and/or a stereo camera 42 (see FIG. 3) that two cameras are provided at a certain interval therebetween and a distance to an object of shooting or the object can be recognized on the basis of images shot at the same time by the two cameras. However, one or more sensors other than these may be used.

The own vehicle position detection sensor 50 is used to detect vehicle motion information such as the position, attitude, travel speed and acceleration of the own vehicle. As illustrated in FIG. 3, for example, the own vehicle position detection sensor 50 may include a GPS receiver 51, a gyro device 53, an acceleration sensor 54, and a wheel speed sensor 55. The GPS receiver 51 can detect the position and attitude of the vehicle by receiving at an antenna 52 radio waves transmitted from a plurality of GPS (Global Positioning Systems). The gyro device 53 and acceleration sensor 54 can detect the angular velocity and acceleration of the vehicle. The wheel speed sensor 55 can detect the wheel rotation speed of the vehicle. The own vehicle position detection sensor 50 shall not be limited to the above-described examples.

The communication device 82 establishes wireless communicative connections between the own vehicle 12 and the traffic controller 11.

The vehicle control equipment 70 includes a brake device 71 for decelerating or stopping the own vehicle 12, a steering device 72 for changing the steering angle, and a drive control device 73 for increasing or decreasing the fuel injection rate.

The vehicle ECU 30 is an electronic control unit (ECU) having various function means to be realized through execution of programs stored in a memory by CPU. As illustrated in FIG. 3, the vehicle ECU 30 includes an obstacle detection unit 31, an own vehicle position detection unit 32, a communication control unit 36, a map database 37, a vehicle control unit 33, an avoiding path generation unit 34, and a departure existence/non-existence determination unit 35.

The obstacle detection unit 31 has functions to detect the relative position and relative speed of an obstacle in surroundings of the own vehicle 12, the size of the obstacle in the vehicle width direction, and the like on the basis of output data from obstacle detection sensors 40 of various kinds mounted on the own vehicle 12 and to notify the vehicle control unit 33 of obstacle information to be needed.

The own vehicle position detection unit 32 has functions to detect the position, attitude and speed of the own vehicle 12 on the basis of output data from the own vehicle position detection sensor 50 mounted on the own vehicle 12 and to notify these information to the vehicle control unit 33.

The communication control unit 36 has a function to control mutual communications between the traffic controller 11 and the own vehicle 12 by using the communication device 82.

The map database 37 stores information of travel paths at the working site and information of travel conditions and travel-permitted regions for the travel paths as notified from the traffic controller 11.

The avoiding path generation unit 34 generates an avoiding path for the own vehicle to avoid the obstacle. Described more specifically, the avoiding path generation unit 34 determines, as an avoiding point, a point where the own vehicle has changed its position over a maximum amount of movement from the position of the obstacle toward the side of the adjacent lane and, if the distance between the avoiding point and the target trajectory in the adjacent lane is greater than the width of the own vehicle, generates an avoiding path for allowing the own vehicle to pass through the avoiding point. Consequently, it is possible to avoid an interference between both the vehicles even if the own vehicle and the oncoming vehicle pass each other at the avoiding point.

If the obstacle detection sensor (environmental sensor) of the own vehicle do not detect a new obstacle different from the front obstacle while traveling on the avoiding path, the avoiding path generation unit 34 further generates a return path for allowing the own vehicle to return from the avoiding point to the target trajectory in the travel lane. This allows the own vehicle to return when no additional obstacle exists further ahead of the front obstacle, so that the adjacent lane can be vacated more promptly. It is possible to avoid an interference with another obstacle.

The curvatures of the avoiding path and return path may be set so that a lateral acceleration to be applied to the own vehicle, which is traveling on the avoiding path, does not exceed a reference lateral acceleration provided for the prevention of overturning of the own vehicle. Consequently, the own vehicle is allowed to travel more safely without needing steering control at an acute angle even during an obstacle avoidance/return action.

If the own vehicle travels along the avoiding path, the departure existence/non-existence determination unit 35 determines whether the own vehicle may depart from the first travel-permitted region. If determined not to depart, an avoidance action is feasible within the first travel-permitted region so that the own vehicle can take the avoidance action without affecting the oncoming lane. If determined to depart, the acceptance or rejection of an avoidance action can be determined by taking, into consideration, effects to the oncoming lane.

The vehicle control unit 33 has a function to give a control instruction to the vehicle control equipment 70 so that, on the basis of the travel condition, travel path and travel-permitted region instructed from the traffic controller 11 and the own vehicle position information notified from the own vehicle position detection unit 32, the own vehicle 12 travels under the travel conditions in the travel-permitted region set on the travel path. Consequently, the own vehicle 12 autonomously travels to the destination.

The vehicle control unit 33 also has a function as a movement amount calculation unit that calculates a maximum amount of movement in the width direction of the own vehicle, which is required to avoid an obstacle, on the basis of the relative position of the obstacle, the size of the obstacle in the width direction and the width of the own vehicle. Its details will be described subsequently herein.

A description will next be made about the configuration of the manned vehicle 13. As illustrated in FIG. 1, the manned vehicle 13 includes a display device 63, an input device 64, an own vehicle position detection sensor 65, a communication device 83 and a navigation ECU 90, all of which are mounted on the manned vehicle 13. The manned vehicle 13 is configured of the navigation ECU 90 and the display device 63, input device 64, own vehicle position detection sensor 65 and communication device 83 electrically connected, respectively.

The own vehicle position detection sensor 65 is used to detect the traveling positon, attitude and speed of the manned vehicle 13, and similar to the sensor mounted on the own vehicle 12, may use a GPS receiver or the like.

The display device 63 displays the travel path, travel-permitted region and the position of the own vehicle, which have been instructed from the traffic controller 11, on a display screen constructed, for example, of LCD. Consequently, the driver of the manned vehicle 13 can confirm at which position of the mining site the manned vehicle 13 is traveling currently.

The input device 64 is used to give a switching instruction to the display screen of the display device 63, and to allow the driver to obtain for the traffic controller 11 an acceptance of a departure from the travel-permitted region.

The communication device 83 performs control on wireless communications between the manned dump truck 13 and the traffic controller 11.

The navigation ECU 90 has a function to compute, on the basis of the travel-permitted region obtained via the communication device 83, the own vehicle position information outputted from the own vehicle position detection sensor 65 and the travel path information stored in the navigation ECU 90, at which position the manned vehicle 13 is travelling relative to the travel path and travel-permitted region. If determined that the own vehicle position may depart from the travel-permitted region, the navigation ECU 90 may use the display device 63 to notify the driver to the effect that the own vehicle position may depart, or may produce a warning when the own position should have departed from the travel-permitted region.

Figure 5:
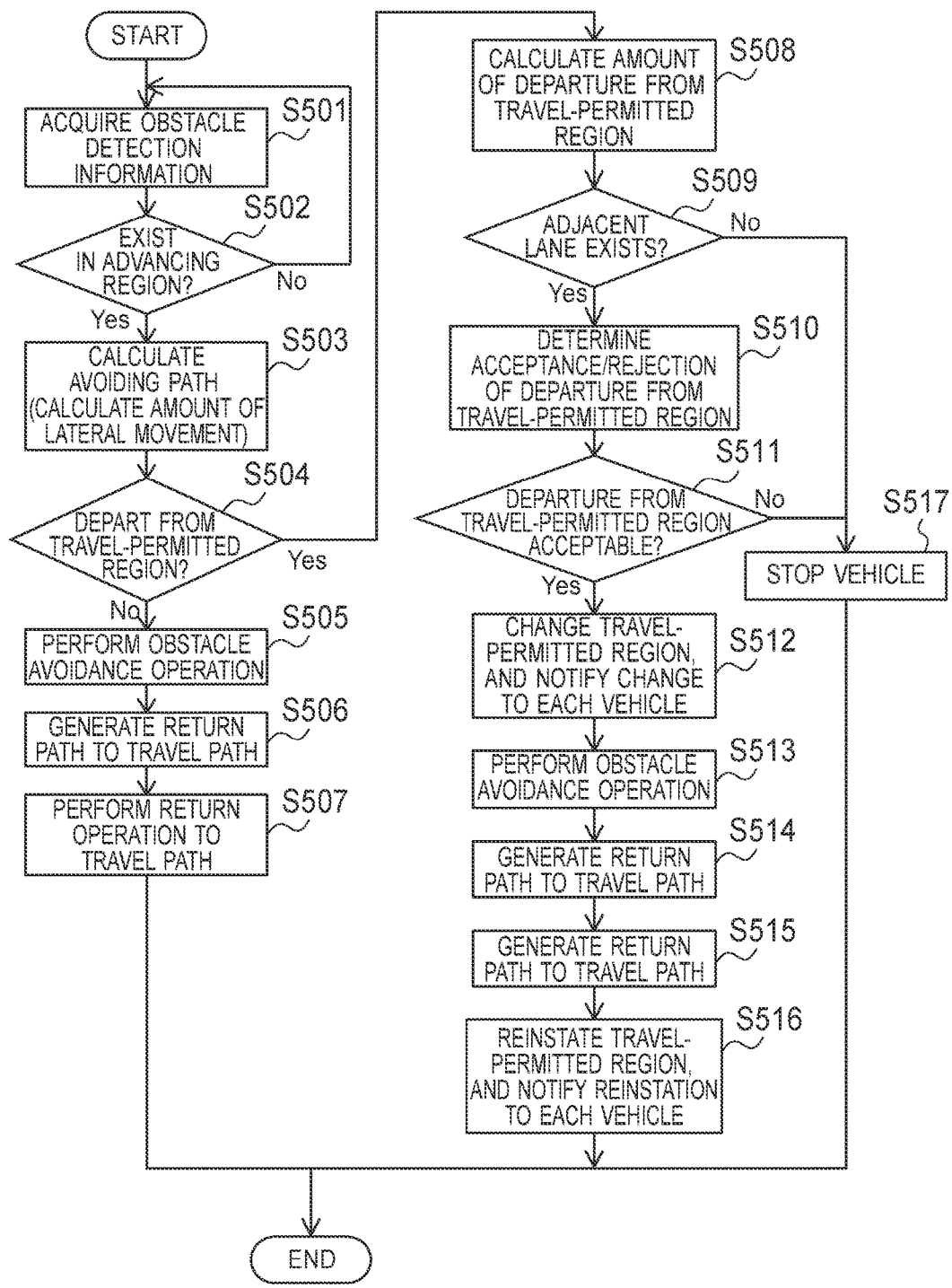
FIG. 5 is a flow chart illustrating a flow of obstacle avoidance processing.
Figure 6:
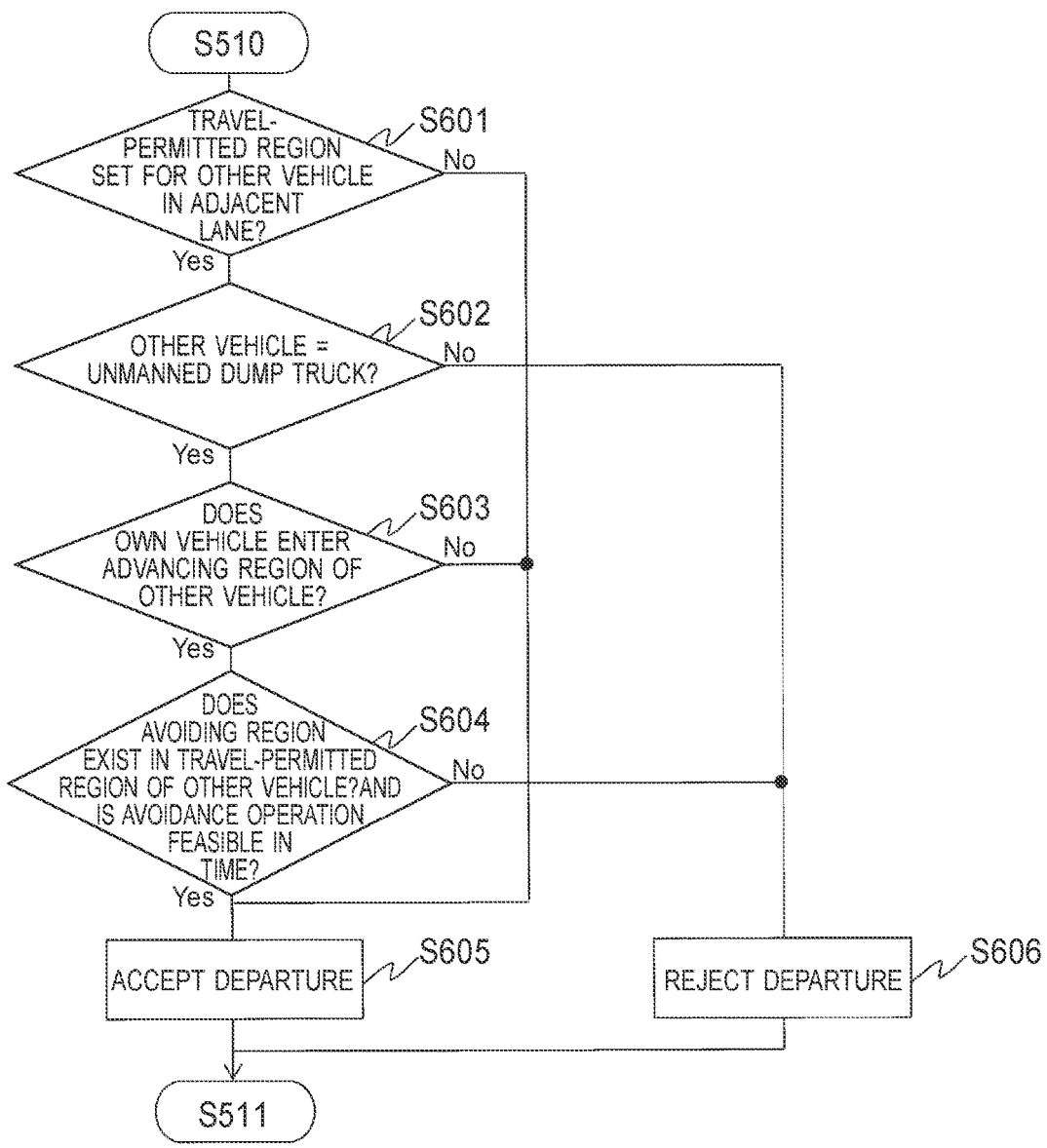
FIG. 6 is a flow chart illustrating a flow of determination processing of acceptance/rejection of a departure from a travel-permitted region.
Figure 7:
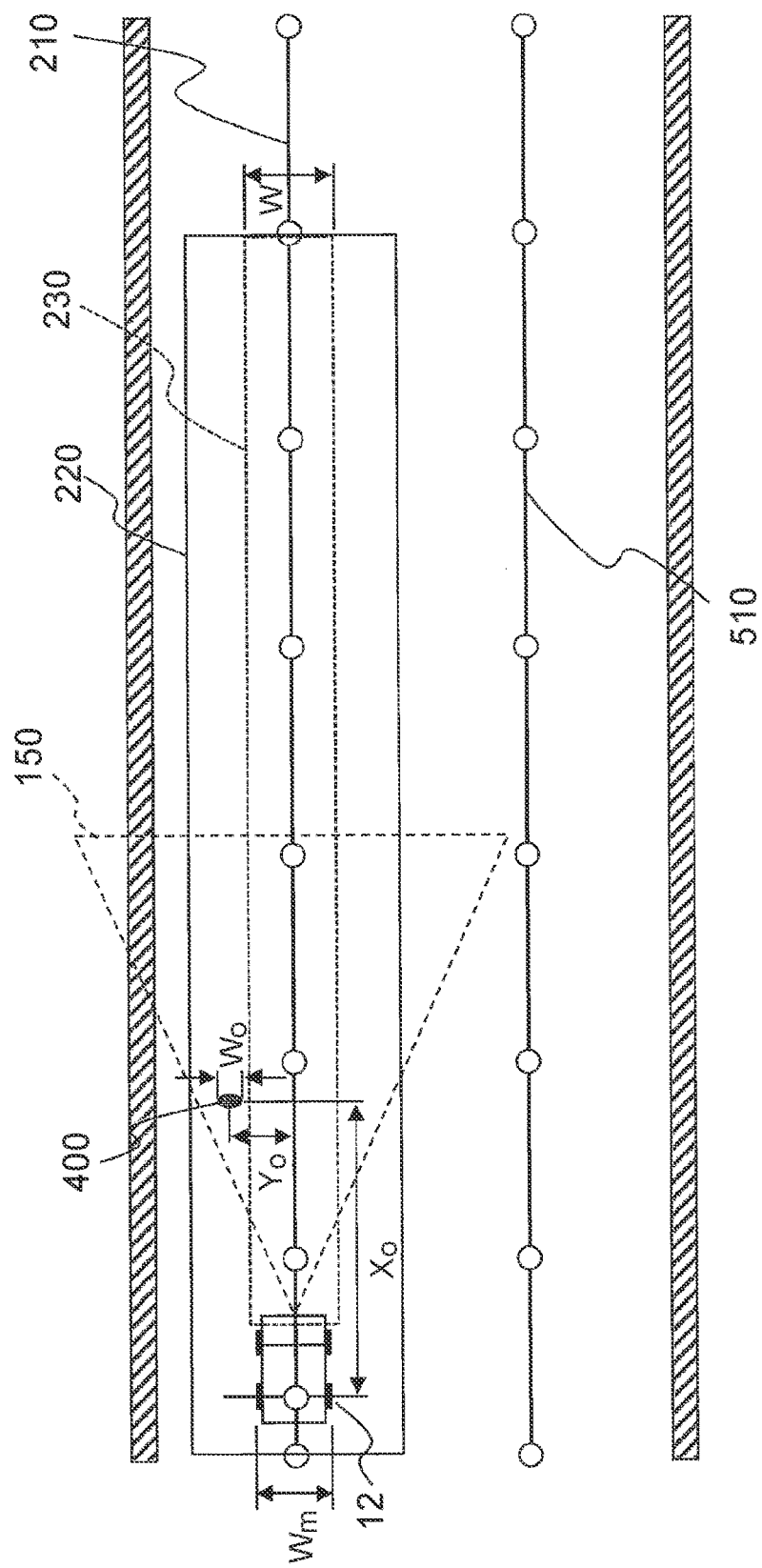
FIG. 7 shows a case that an obstacle exists outside an advancing region of the unmanned vehicle.
Figure 11:
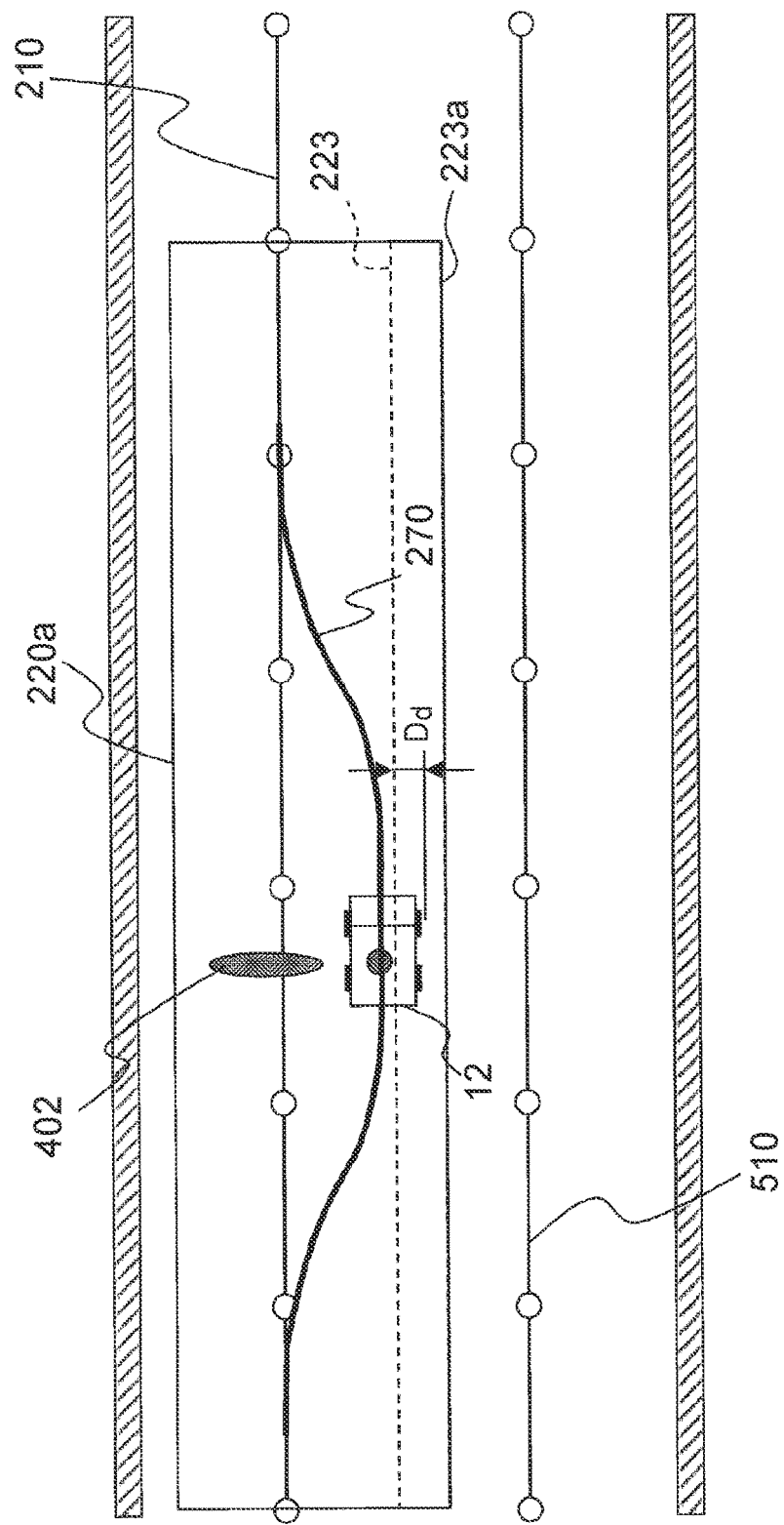
FIG. 11 is a diagram illustrating a renewal of the travel-permitted region in the case of FIG. 10.
Figure 12:
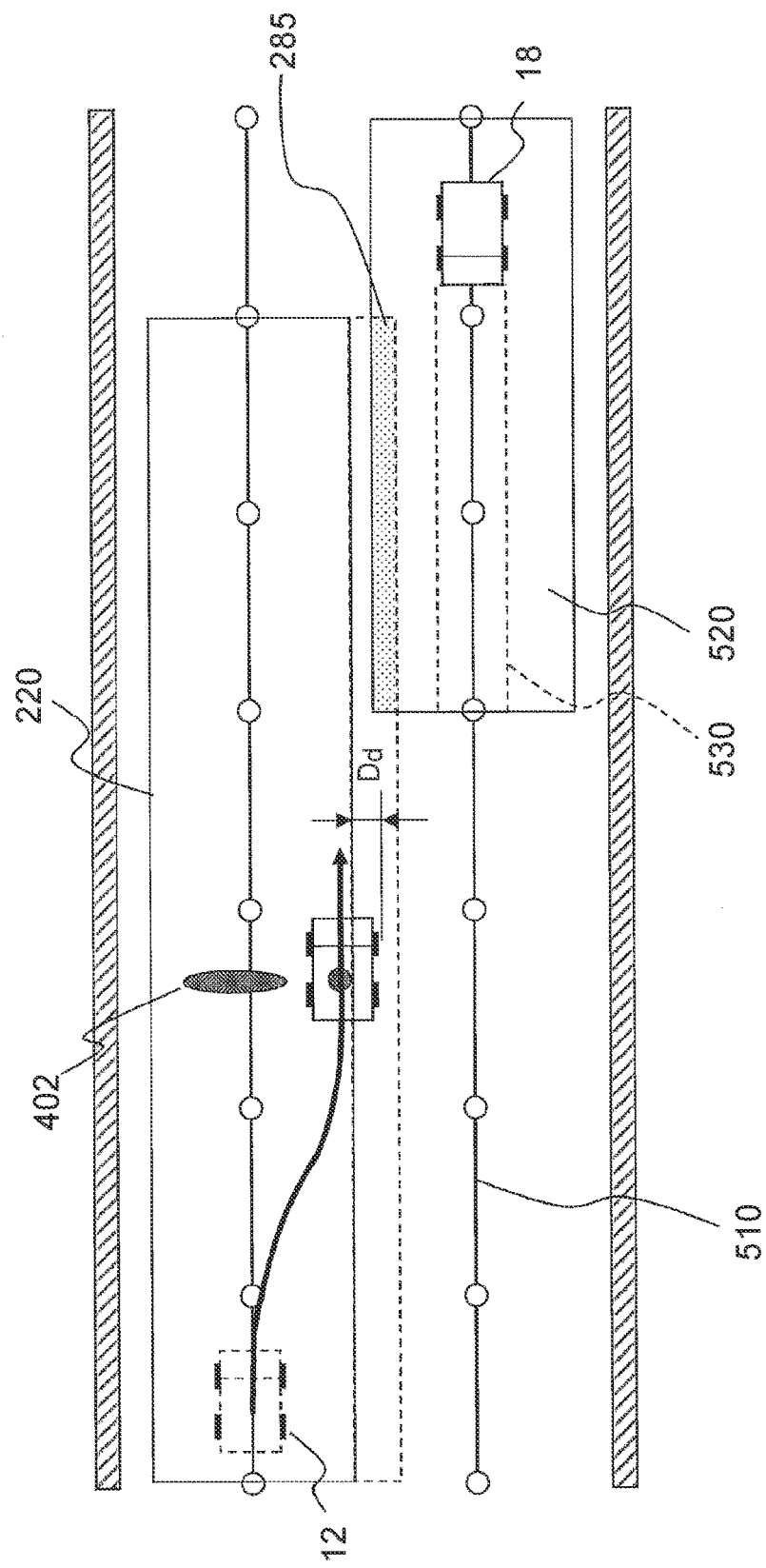
FIG. 12 is a diagram illustrating a case that there is a traveling unmanned dump truck in an adjacent lane.
Figure 13:
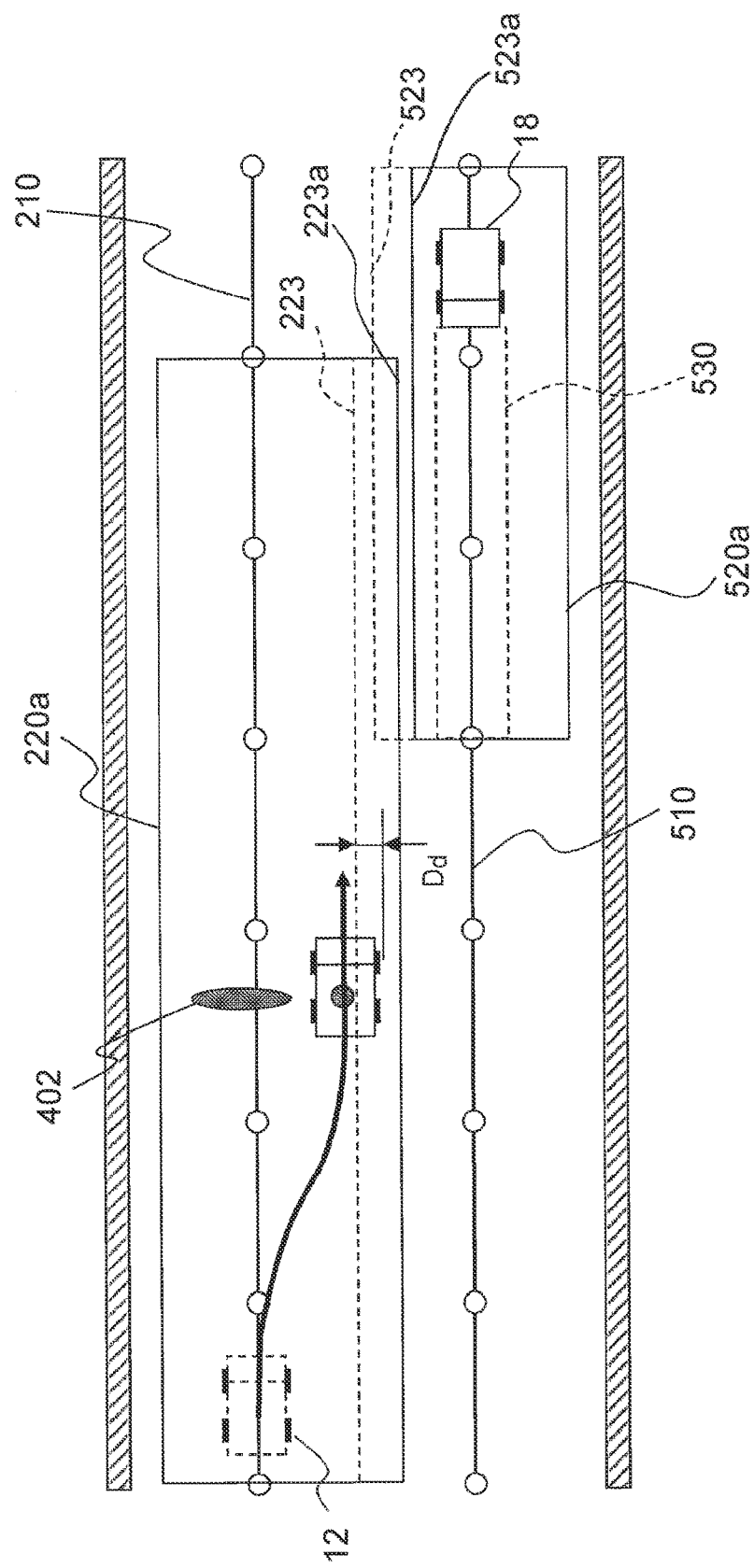
FIG. 13 is a diagram illustrating a renewal of a travel-permitted region in the case of FIG. 12.
Figure 14:
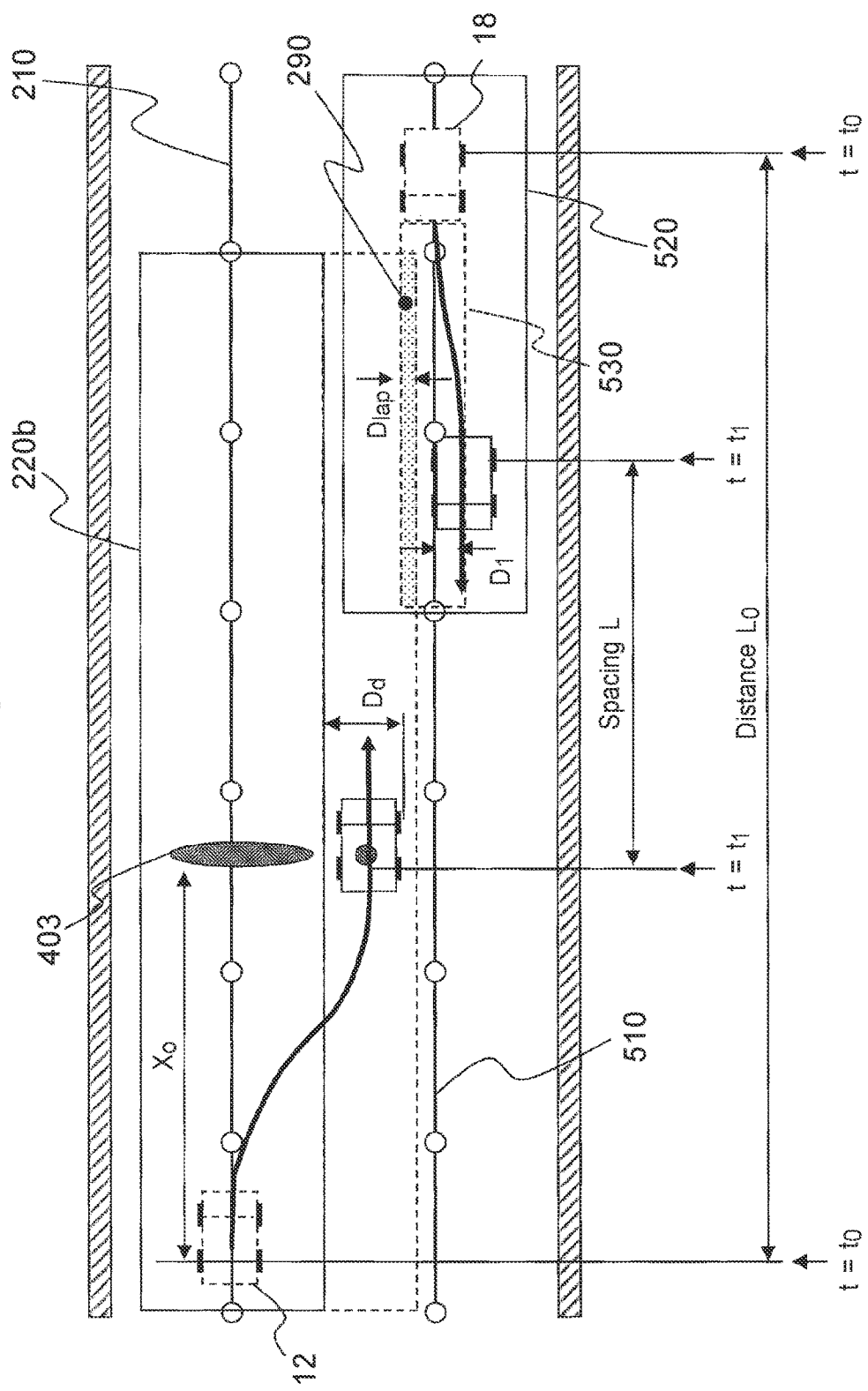
FIG. 14 is a diagram illustrating a case that there is a traveling unmanned dump truck in an adjacent lane and a travel-permitted region overlaps an advancing region of the unmanned dump truck traveling in the adjacent lane if a travel-permitted region is changed to avoid an obstacle.

With reference to FIGS. 5 through 14, a description will hereinafter be made about a flow that performs an avoidance action in accordance with the position and size of an obstacle which the own vehicle 12 has detected during traveling on the travel path. FIG. 5 is a flow chart illustrating a flow of obstacle avoidance processing. FIG. 6 is a flow chart illustrating a flow of determination processing of acceptance/rejection of a departure from a travel-permitted region as described in step S510 of FIG. 5. FIG. 7 a diagram illustrating a case that an obstacle exists outside an advancing region of the unmanned vehicle. FIGS. 8A and 8B are diagrams illustrating a case that an obstacle exists in an advancing region of the unmanned vehicle and can be avoided in a travel-permitted region, in which FIG. 8A is an overall diagram and FIG. 8B is an enlarged diagram of surroundings of the vehicle. FIG. 9 is a diagram illustrating how a path is generated to return to a travel path after an obstacle avoidance action in the case of FIGS. 8A and 8B. FIG. 10 is a diagram illustrating a case that an obstacle exists in an advancing region of the unmanned dump truck and the dump truck has to depart from a travel-permitted region. FIG. 11 is a diagram illustrating a renewal of the travel-permitted region in the case of FIG. 10. FIG. 12 is a diagram illustrating a case that there is a traveling unmanned dump truck in an adjacent lane. FIG. 13 is a diagram illustrating a renewal of a travel-permitted region in the case of FIG. 12. FIG. 14 is a diagram illustrating a case that there is a traveling unmanned dump truck in an adjacent lane and a travel-permitted region overlaps an advancing region of the unmanned dump truck traveling in the adjacent lane if the travel-permitted region is changed to avoid an obstacle. A description will hereinafter be made in the order of the respective steps in FIG. 5.

In step S501, the obstacle detection unit 31 performs acquisition of obstacle detection information (S501). As illustrated in FIG. 7, the obstacle detection sensor 40 generate detection data of the inside of a detection area 150, and outputs it to the obstacle detection unit 31. The obstacle detection unit 31 detects an obstacle 400 in the detection area 150 on the basis of the detection data, and outputs the detection result of the obstacle 400 to the vehicle control unit 33. At the vehicle control unit 33, a relative distance $(X_o, Y_o)$ of the obstacle 400 from the own vehicle 12, which is an unmanned dump truck, and its size $(W_o)$ are detected. Here, it is to be noted that the relative distance $(X_o, Y_o)$ is calculated in a coordinate system created along the travel path by using, as an origin, a point of intersection between the travel path and a vertical line drawn down onto the travel path from the center of a rear axle of the own vehicle 12; as an X-axis, the advancing direction of the vehicle; and as a Y-axis, the direction of the vehicle width that is perpendicular to the advancing direction of the vehicle.

In step S502, a determination is next made as to whether the detected obstacle 400 exists in an advancing region of the own vehicle 12. As illustrated in FIG. 7, the advancing region is a region 230 that in the travel-permitted region 220, is located ahead of the current position of the own vehicle 12, extends in the advancing direction of the vehicle, and has a width in the vehicle width direction. The width W is set at a length equal to the width Wm of the own vehicle 12 (W≈Wm). Here, a determination formula for whether the obstacle exists in the advancing region 230 is expressed by the following formula:

[formula 1]

$$-\frac{W+W_o}{2} \le Y_o \le \frac{W+W_o}{2} \qquad (1)$$

If the obstacle 400 does not exist in the advancing region 230 (S502/NO), the own vehicle 12 does not interfere with the obstacle 400 even when the own vehicle 12 continues to travel in the advancing region 230. The processing, therefore, returns to step S501, where detection is continued for any front obstacle.

Figure 8A:
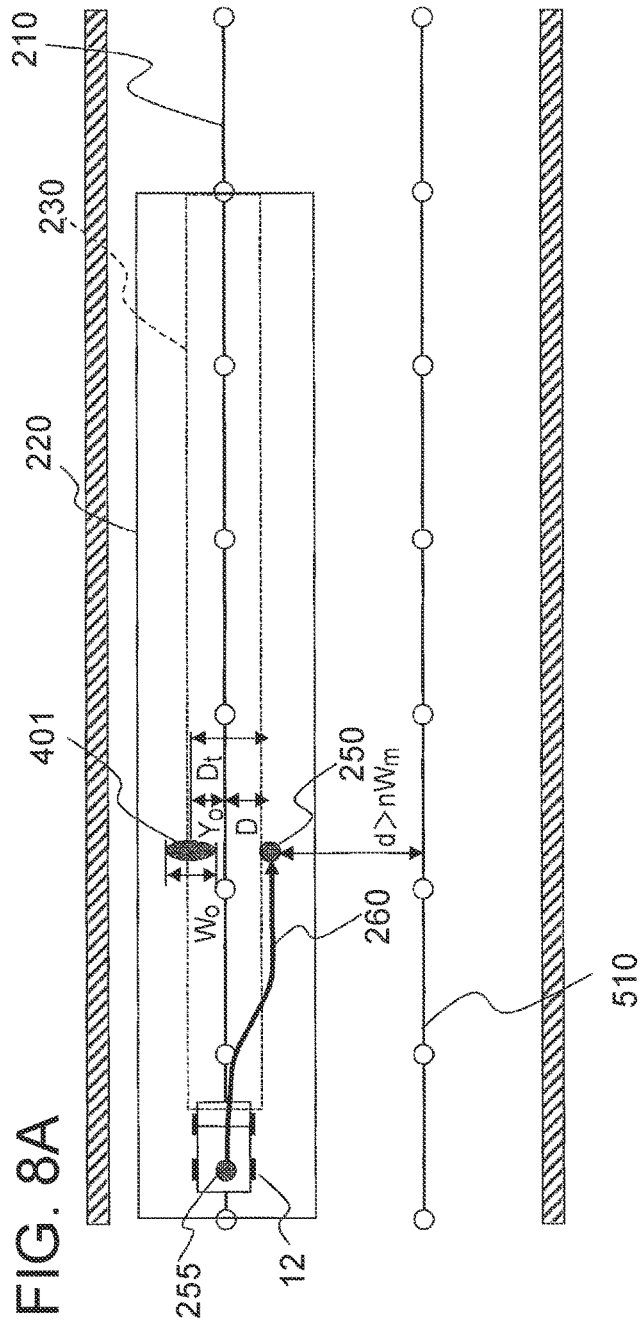
Figure 8B:
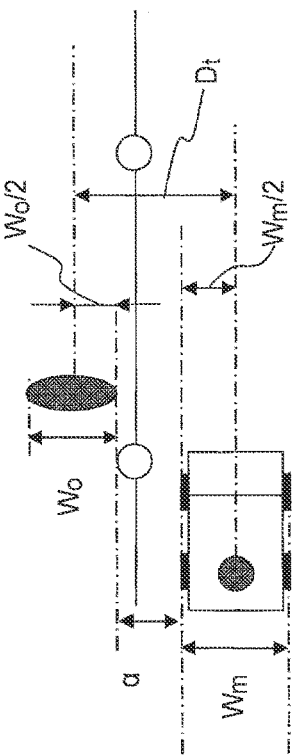

If the obstacle 400 exists in the advancing region 230 (S502/YES), for example, if the above-described formula (1) is not satisfied similar to the positional relation between an obstacle 401 and the own vehicle 12 as illustrated in FIGS. 8A and 8B, the own vehicle 12 interferes with the obstacle 400 when the own vehicle 12 continues to travel in the advancing region 230. The processing then advances to step S503, where a front obstacle avoidance action is initiated.

In step S503, the avoiding path generation unit 34 implemented in the vehicle ECU 30 calculates an amount of lateral movement required for avoiding the obstacle (S503). About generation processing of an avoiding path, a description will be made with reference to FIGS. 8A and 8B. The avoiding path generation unit 34 calculates an amount D of lateral movement over which the own vehicle 12 has to move in a lateral direction relative to the travel path for avoiding the obstacle (see FIG. 8A). To prevent the own vehicle 12 from coming into contact with the obstacle 401, the own vehicle 12 has to travel through a position that is apart from a central position of the obstacle 401 by a distance $D_t$ (see FIG. 8B) represented by the below-described formula (2), in which α represents a clearance distance of the own vehicle 12 from the obstacle 401 when the own vehicle 12 has approached adjacent to the obstacle 401. Now, the position, which is adjacent to the obstacle and through which the own vehicle 12 has to pass upon avoidance of the obstacle 401, will be called an "avoiding point 250". At the avoiding point 250, the amount D of lateral movement from the current position of the own vehicle 12 in the direction of a Y-axis increases to a maximum amount of movement.

[formula 2]

$$D_t = \frac{W_o}{2} + \frac{W_m}{2} + \alpha \quad (2)$$

Therefore, the amount D of movement from the travel path is calculated by the following formula (3):

[formula 3]

$$D = D_t - D_o \ldots \quad (3)$$

In step S504, the vehicle control unit 33 determines in accordance with the following formula (4) whether the own vehicle 12 may depart from the travel-permitted region 220 when moving over the amount D of lateral movement as calculated in accordance with the formula (3) and passing through the avoiding point 250. Here, the lateral width of the travel-permitted region at the avoiding point 250 is assumed to be $W_l$, $W_r$ on left and right sides, respectively, relative to the advancing path. Further, the formula (4) is a determination formula when the own vehicle 12 averts to the right side relative to the advancing path, while the formula (5) is a determination formula when the own vehicle 12 averts to the left side relative to the advancing path.

[formula 4]

$$D + \frac{W_m}{2} \leq W_r \quad (4)$$

[formula 5]

$$D + \frac{W_m}{2} \leq W_l \quad (5)$$

If the formula (4) or the formula (5) is satisfied, in other words, if the own vehicle 12 is determined not to depart from the travel-permitted region 220 (S504/No), and the processing advances to step S505, where an obstacle avoidance action is taken. The positional relation between the dump truck 12 and the obstacle 401 as illustrated in FIGS. 8A and 8B changes from step S504 to step S505 because the formula (4) is satisfied.

If neither the formula (4) nor the formula (5) is satisfied, in other words, if the own vehicle 12 is determined to depart from the travel-permitted region 220 (S504/Yes), the processing advances to execution processing of an avoidance action that uses the adjacent lane (step S508 and onwards). Details of the execution processing will be mentioned subsequently herein.

In step S505, the vehicle control unit 33 next performs, on the basis of the amount D of lateral movement as calculated by the avoiding path generation unit 34 in step S503, steering control on the steering device 72 of the vehicle control equipment 70 to avoid the obstacle 401 (S505).

As illustrated in FIGS. 8A and 8B, for example, a steering control method may comprise calculating a clothoid curve that connects point 255 on a target trajectory at the current position of the unmanned dump truck 12 and the avoiding point 250 together, and then performing steering control so that the unmanned dump truck 12 travels on and along the clothoid curve. However, the steering control method is not limited to this method, and another steering control method may be used.

In step S506, the generation of a return path to the travel path is then performed if the vehicle control unit 33 determines that no obstacle exists on the advancing path of the vehicle (S506). As the generation of the return path, a path that allows the own vehicle 12 to move by the amount D of movement to the side of the target trajectory may be generated in a similar manner as in step S505. FIG. 9 illustrates processing in this step. The own vehicle 12, which is located at the avoiding point, performs monitoring for a front obstacle in the advancing direction of the vehicle by obstacle detection sensor 40. If no obstacle exists, the own vehicle 12 may generate a return path on the basis of an amount of steering in step S505 until shortly before a passage through the avoiding point 250, or may generate a return path 270 by reversing the clothoid curve, which was calculated in step S505, about an axis in the advancing direction of the vehicle.

The vehicle control unit 33 then performs steering control so that the own vehicle 12 travels along the return path generated in step S506, and allows the own vehicle 12 to the target trajectory 210 in the travel lane (S507). By the foregoing processing, the obstacle avoidance and return action in the travel-permitted region as illustrated in FIGS. 8A and 8B and FIG. 9 has been completed.

A description will next be made about a case that the own vehicle 12 has been determined to depart from the travel-permitted region (S504/Yes).

In step S508, the vehicle control unit 33 calculates the amount of a departure of the own vehicle 12 from the travel-permitted region 220 in accordance with the following formulas (6),(7) (S508).

[formula 6]

$$D_d = W_r - \left(D + \frac{W_m}{2}\right) \quad (6)$$

-continued

[formula 7]

$$D_d = W_l - \left(D + \frac{W_m}{2}\right) \quad (7)$$

In step S509, the vehicle control unit 33 confirms, with reference to the map information stored in the map database 28, whether there is an adjacent lane in the direction of a departure from the travel-permitted region 220. This is a determination condition under the assumption of a case that the travel path has a single lane. As there is a potential danger in the case of a single lane that the own vehicle 12 may fall down from a cliff or may collide with a banking if it departs from the travel-permitted region, the processing is allowed to advance, without allowing the own vehicle 12 to depart from the travel-permitted region 220, to step S613, where the own vehicle 12 is stopped.

If there is an adjacent lane (S509/Yes), the departure acceptance/rejection determination unit 26 of the traffic controller 11 makes a determination as to whether the own vehicle 12 may depart from the travel-permitted region 220 (S510). Referring to FIG. 6, a description will be made about determination processing to be performed in this step for the acceptance/rejection of a departure from the travel-permitted region.

There are the following four determination conditions for the departure acceptance/rejection of a departure from the travel-permitted region. In the order of the individual steps shown in FIG. 6, the departure acceptance/rejection determination unit 26 makes a determination of acceptance/rejection.

In step S601, the departure acceptance/rejection determination unit 26 first determines whether a travel-permitted region has been set for the other vehicle in the adjacent lane. If affirmative (S601/Yes), a determination is made as to whether the vehicle traveling in the adjacent lane is an unmanned dump truck (S602).

If the vehicle traveling in the adjacent lane is determined to be a manned vehicle in step S602 (S602/No), the unmanned vehicle 12 is prohibited from departing from the travel-permitted region 220 (S606). As the display device 63, which displays the positional relation between the travel-permitted region and the own vehicle to the driver, is mounted on the manned vehicle, it is possible to inform that the own vehicle 12 is coming closer to the side of the manned vehicle. However, the own vehicle 12 is stopped as a safety measure in case that the driver should fail to notice this information (S606 to S511, S517).

If the other vehicle travelling in the adjacent lane is an unmanned dump truck (S602/Yes), on the other hand, a determination is made as to whether the own vehicle may enter the advancing region of the other vehicle (S603). If determined to enter (S603/Yes), the departure acceptance/rejection determination unit 26 determines that the own vehicle may depart from the travel-permitted region (S605), provided that there is an avoidance region for allowing the other vehicle to avoid the own vehicle and an avoidance action can be taken in time (S604/Yes).

If no travel-permitted region is set for the other vehicle in the adjacent lane (S601/No; see FIG. 10) or if the own vehicle does not enter the advancing region of the other vehicle (S603/No), the departure acceptance/rejection determination unit 26 determines that the own vehicle may depart from the travel-permitted region (S605).

If the other vehicle traveling in the adjacent lane is not an unmanned dump truck, in other words, a manned vehicle (S602/No) or if an avoiding region for allowing the other vehicle to avoid the own vehicle does not exist in the travel-permitted region of the other vehicle or no avoidance action can be taken in time despite the existence of an avoiding region (S604/No), on the other hand, the departure acceptance/rejection determination unit 26 determines rejection of a departure (S606).

If the departure acceptance/rejection determination unit 26 determines in step S605 that the own vehicle may depart (S511/Yes), the travel-permitted region setting unit 25 performs a change to the shape of the travel-permitted region 220 in accordance with the amount $D_d$ of a departure from the travel-permitted region, and notifies the vehicle, for which the travel-permitted region 220 has been set, of the change to the shape of the travel-permitted region (S512). For example, the travel-permitted region setting unit 25 increases the width of the travel-permitted region 220 to a width that embraces the own vehicle 12 travelling on the avoiding path. If a region that overlaps the travel-permitted region 520 of the other vehicle 18 is generated when the width of the travel-permitted region 220 is increased when the width of the travel-permitted region 220 is increased, the travel-permitted region setting unit 25 increases the width of the travel-permitted region 220 to a width that embraces the own vehicle traveling on the avoiding path, and decreases the width of the travel-permitted region 520 of the other vehicle 18 to avoid overlapping the first travel region after the increase in width.

After the travel-permitted region setting unit 25 has performed the change to the width of the travel-permitted region 220, the communication device 81 of the traffic controller 11 transmits information, which indicates the contents of the above-described change, to the communication device 82 of the own vehicle 12, and the information is inputted to the vehicle ECU 30.

On the basis of the results of the change, the own vehicle 12 performs processing for an obstacle avoidance action (S513), the generation of a return path to the target trajectory (S514) and the performance of a return action to the target trajectory (S515) in this order as in steps S505 through S507, whereby the obstacle avoidance action is completed to advance to step S516.

In step S516, the return of the own vehicle 12 to the target trajectory via the communication device 82 is notified to the traffic controller 11. The travel-permitted region setting unit 25 decreases the width of the travel-permitted region 220 to reinstate the same. If the width of the travel-permitted region 520 of the other vehicle 18 has been reduced, the travel-permitted region 520 is widened to reinstate the same. Further, the traffic controller 11 again notifies the own vehicle 12 of the reinstation of the shape of the travel-permitted region 220 (S516) to complete the avoidance sequence in its entirety.

With reference to FIG. 11, a description will be made about an example of a change to the shape of the travel-permitted region 220, in other words, of an increase of the width of the travel-permitted region 220 in the width direction so that the amount D of a departure is embraced. The travel-permitted region setting unit 25 increases a width $W_r$ of the travel-permitted region 220 by an amount, which corresponds to the amount $D_d$ of the departure, on the right side thereof relative to the target trajectory (the right boundary line 223 of the travel-permitted region 220 is shifted to 223a in FIG. 11) so that, when traveling on the avoiding path and return path 270, the own vehicle 12 is controlled not to depart from a new travel-permitted region 220 set for the own vehicle. As the other vehicle does not enter the travel-permitted region 220 allotted to the own vehicle (closed control), the own vehicle 12 does interfere with the other vehicle at the time of an avoidance action for an obstacle 402, and can safely travel.

Referring to FIGS. 12 through 14, a description will hereinafter be made about one example of passing control processing.

FIG. 12 illustrates a state that an obstacle cannot be avoided unless the own vehicle 12 departs from a travel-permitted region 220 set currently. In this case, if the width of the travel-permitted region 220 is increased in accordance with the amount $D_d$, a region 285 which overlaps the travel-permitted region 520 currently set for the other vehicle 18 traveling in a adjacent lane is generated, but the own vehicle 12 does not enter an advancing region 530 of the other vehicle 18. Therefore, in the determination of "DOES OWN VEHICLE ENTER ADVANCING REGION OF OTHER VEHICLE?" in step S603 of FIG. 6, "No" is determined, and a departure is determined to be acceptable (S605).

As illustrated in FIG. 13, the travel-permitted region setting unit 25 hence increases the width of the travel-permitted region 220 from the travel-permitted region 220 of the own vehicle 12 in accordance with an amount $D_d$ of a departure from the travel-permitted region of the own vehicle 12 (the right boundary line 223 of the travel-permitted region 220 is shifted to 223a), and also performs a change to decrease the width of the travel-permitted region 221 (the right boundary line 523 of the travel-permitted region 520 shifts to 523a)(S612). In FIG. 13, the travel-permitted region 220 has been increased in width to a travel-permitted region 220a, and at the same time, the travel-permitted region 520 has been decreased in width to a travel-permitted region 520a. As a result, no overlapping region exists between the travel-permitted region 220a and the travel-permitted region 520a, so that the unmanned dump trucks 12,18 do not interfere each other.

With reference to FIG. 14, a description will also be made about another example of obstacle avoidance processing. FIG. 14 is different from the case of FIG. 12 in that an obstacle 403 has a greater width and the amount D of a departure from the travel-permitted region of the own vehicle 12 is larger. An overlapping region 290 is, therefore, formed between the advancing region 530 of the other vehicle 18 and a travel-permitted region 220b after an increase of its width. In step S603, the own vehicle is hence determined to enter the advancing region of the other vehicle in step S603 (S603/yes), and the processing advances to step S604.

Then, a determination is made about whether the other vehicle 18 may depart from its travel-permitted region 520 when the other vehicle 18 avoids the overlapping region 290, and another determination is made whether a spacing L is sufficiently ensured between the own vehicle 12 and the other vehicle 18 when the own vehicle 12 avoids the obstacle 403 on the basis of the amount D of a lateral movement. Assuming that the width of the overlapping region 290 is $D_{lap}$ and the amount of a lateral movement over which the other vehicle 18 has to laterally move to avoid the overlapping region 290 is D1, it is possible to determine by the formula (5) whether the other vehicle 18 may depart from the travel-permitted region 520 when the other vehicle 18 avoid the overlapping region 290.

As the formula (5) is satisfied in FIG. 14, it is determined that the other vehicle 18 can avoid the overlapping region 290 within the travel-permitted region 520. Now assume that a time at which the own vehicle 12 performed the avoidance processing of the obstacle 403 is t0 and the distance between the own vehicle 12 and the other vehicle 18 along the path at that time is L0. Also assuming that the travel speeds of the own vehicle and the other vehicle 18 are V100 and V101 and the distance between the own vehicle 12 and the obstacle 403 is Xo, a spacing L between the own vehicle 12 and the other vehicle 18 when the own vehicle 12 avoided the obstacle 403 is estimated by the following formula:

[formula 8]

$$L = L0 - Xo - V_{101} \cdot \frac{Xo}{V_{100}} \qquad (8)$$

Whether the spacing L is sufficiently ensured can be determined, for example, by ascertaining braking avoidance limit distances Lth for travel speeds of unmanned dump trucks in advance and checking if L>Lth. Assuming that the unmanned dump trucks have a maximum deceleration A and the relative speed between unmanned dump trucks is Vr, the braking avoidance limit distance Lth can be calculated by Lth=Vr2/2A. In the example of FIG. 14, the spacing L is assumed to be longer than the braking avoidance limit distance Lth. As a result of the determination in step S604 as described above, the processing advances to step S605, where the own vehicle 12 is determined by the departure acceptance/rejection determination unit 26 to be able to avoid the obstacle 403 by departing from the travel-permitted region.

The subsequent processing is similar to FIG. 13, but is different in that the other vehicle 18 laterally moves over an amount D1 of lateral movement in step S513. The avoidance action of the own vehicle 12 has been completed in its entirety, and the traffic control subsystem is notified in step S516 to the effect that the return to the travel path has been completed, whereby the travel-permitted regions of both the unmanned dump trucks are reinstated. Consequently, the other vehicle 18 performs reinstation to the original travel path from the state that it has laterally moved over the amount D1 of lateral movement. By the foregoing, the avoidance sequence has now been completed in its entirety.

According to this embodiment, the distance between an avoiding point and the center line of an adjacent lane is set broader than the width of an own vehicle so that, even if the own vehicle and another vehicle of the same type pass each other at the avoiding point upon avoiding an obstacle, the own vehicle does not interfere with the another vehicle. By increasing the width of a travel-permitted region of the own vehicle, decreasing the width of a travel-permitted region of the another vehicle, and also allowing the another vehicle to take an avoidance action while taking into consideration the position of the another vehicle in an adjacent lane and the state of setting of the travel-permitted region set for the another vehicle, it is possible to perform an avoidance action of the obstacle by using the adjacent lane while reducing effects to the traveling state of the another vehicle in the adjacent lane.

Second Embodiment

Figure 15:
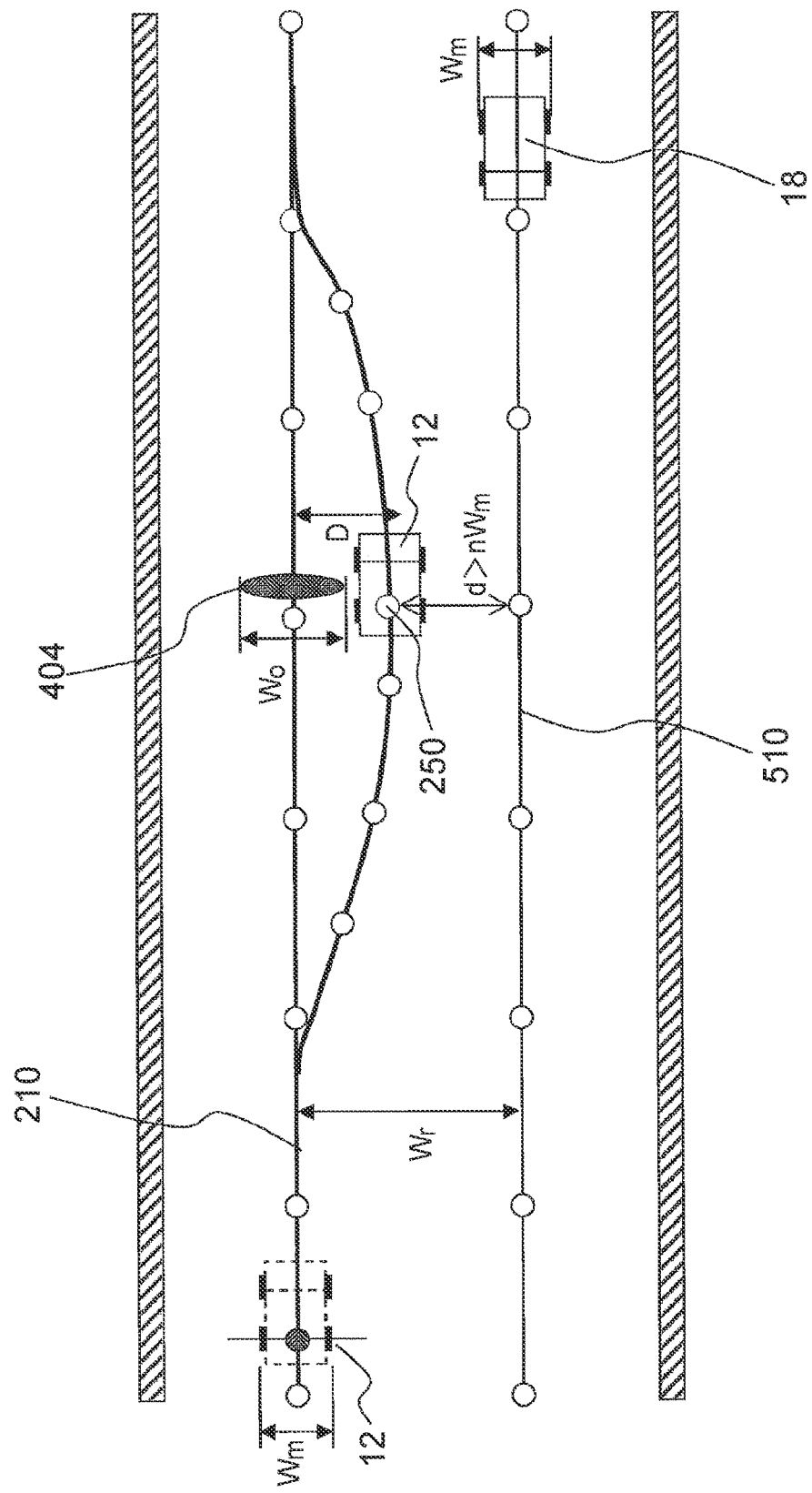
FIG. 15 is a diagram illustrating one example of a positional relation between an own vehicle and an adjacent lane according to a second embodiment.

A second embodiment generates the map information of a haul road (approach lane and return lane) as one dimensional information by using only nodes and links, and performs an avoidance action of an obstacle on the basis of the results of a comparison of distances d between a target trajectory, an avoiding path, and a target trajectory in an adjacent lane. The second embodiment is different from the first embodiment in that the map information is not two-dimensional information but one-dimensional information, and the remaining elements of configuration and the flow of processing are the same, so that overlapping description is omitted. Referring to FIG. 15, a description will hereinafter be made about the generation of an avoiding path according to the second embodiment. FIG. 15 is a diagram illustrating one example of a positional relation between an own vehicle and an adjacent lane according to a second embodiment.

The map information in the second embodiment is defined using a one-dimensional target trajectory, which is in turn defined from plural nodes arrayed in a travel direction of each lane and links connecting the adjacent ones of the nodes. A travel-permitted region is defined by a one-dimensional region consisting of a partial region of the target trajectory. The avoiding path generation unit 34 generates an avoiding path when the distance from the avoiding point to the target trajectory in the adjacent lane is greater than the width of the own vehicle.

Described specifically, as illustrated in FIG. 15, the own vehicle 12 avoids the obstacle 403 by being allowed to travel through the avoiding point 250 of the own vehicle 2 when the distance d between the avoiding point 250 and a target trajectory 510 is n times the width W of the own vehicle 12 (n>1). Consequently, when the unmanned dump truck 18 traveling in the adjacent lane and the own vehicle 12 have the same width and the other vehicle 18 is traveling on the target trajectory in the adjacent lane, a margin(d-Wm) can be ensured to avoid an interference between both the vehicles even if the own vehicle 12 and the other vehicle 18 pass each other while coming closest to each other.

According to this embodiment, an obstacle avoidance action, which uses an adjacent lane, can be taken without performing processing such as a change to the width of a travel-permitted region.

The above-described embodiments shall not be taken as limiting the present invention, and there are various embodiments which do not depart from the spirit of the present invention. For example, the avoiding path generation unit 34 and departure existence/non-existence determination unit 35 in the vehicle ECU 30 mounted on the own vehicle may be stored in the traffic ECU 20 in the traffic controller 11. In this case, obstacle detection information and travel information, which are needed to realize the functions of the avoiding path generation unit 34 and departure existence/non-existence determination unit 35, may be periodically notified from the own vehicle 12 to the traffic controller 11.

Figure 16:
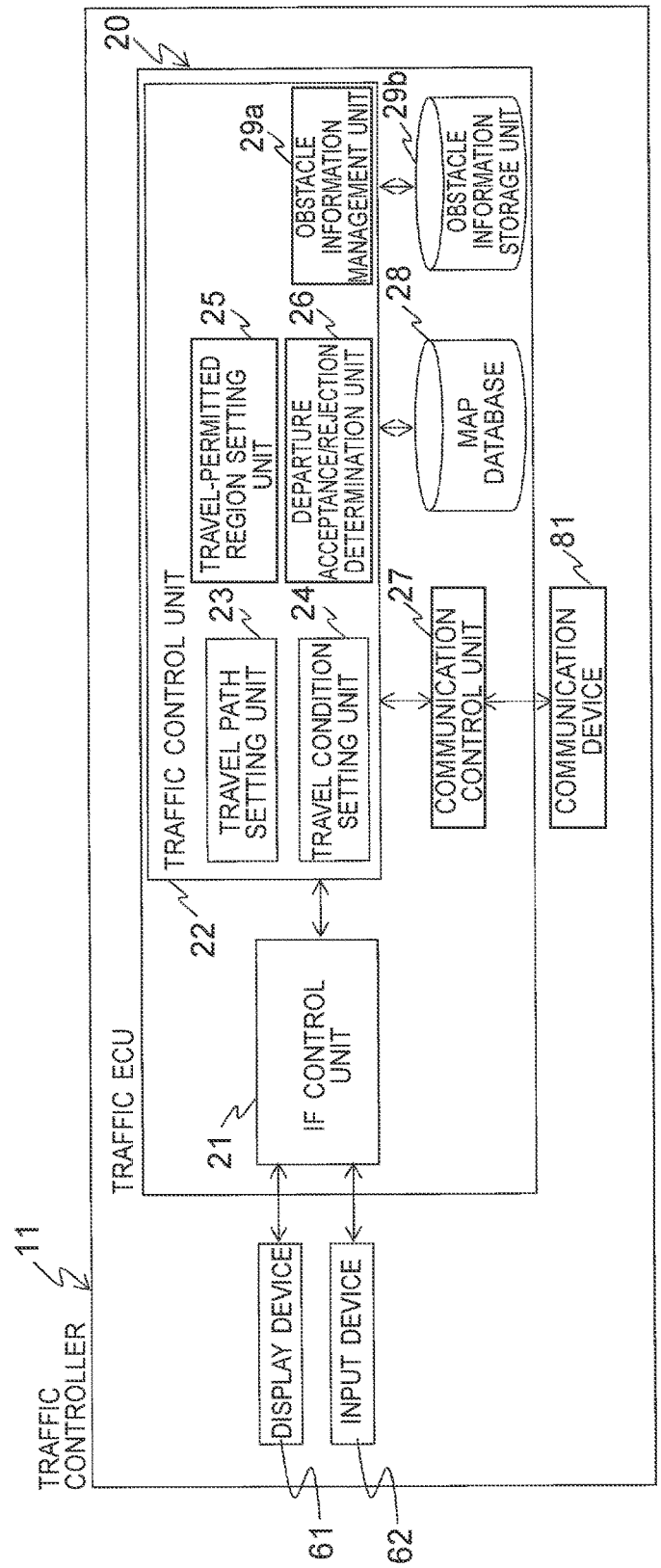
FIG. 16 is a block diagram illustrating the configuration of a traffic control subsystem according to a further embodiment.

To enable the traffic controller 11 to conduct state control of travel paths at a mining site, the own vehicle 12 may notify the traffic controller 11 of obstacle detection information such as the position, size and the like of an obstacle an avoidance of which is determined to be needed. The notification to the traffic controller 11 can make efficient the maintenance activities for the mining site. A description will be made with reference to a block diagram of FIG. 16, which illustrates the configuration of a traffic controller 11. As illustrated in FIG. 16, the traffic ECU 20 of the traffic controller 11 is provided with an obstacle information storage unit 29b that stores information of an obstacle on a travel road, the traffic controller 11 is provided with the function of the avoiding path generation unit 34 to generate an avoiding path, and the travel-permitted region setting unit 25 may set a travel-permitted region on the avoiding path. Further, the traffic controller 11 may be additionally provided with an obstacle information management unit 29a, which acquires detection results from the obstacle detection unit 31, compares them with the obstacle information stored in the obstacle information storage unit 29b, and, when the detection results of the obstacle detection unit 31 are not contained in the obstacle information, adds the detection results of the obstacle detection unit 31 to the obstacle information.

Legends

10: Obstacle avoidance system, 11: Traffic controller, 18: Unmanned dump truck, 13: Manned vehicle, 220: Travel-permitted region, 225: Target trajectory of own vehicle.

The invention claimed is:

1. An obstacle avoidance system for allowing an own vehicle, which is in a travel lane with an adjacent lane provided in parallel with the travel lane, to avoid an obstacle, which is located ahead in the travel lane, by passing the obstacle on a side of the adjacent lane, comprising:

an obstacle detection unit configured to detect, on a basis of an output from an environmental sensor mounted on the own vehicle, a relative position of the obstacle with respect to the own vehicle as a reference and a size of the obstacle in a vehicle width direction;

a movement amount calculation unit configured to calculate, on a basis of the relative position of the obstacle, the size of the obstacle in the vehicle width direction and a width of the own vehicle, a maximum amount of movement of the own vehicle in the vehicle width direction as required to avoid the obstacle;

an avoiding path generation unit configured to determine, as an avoiding point, a point displaced over the maximum amount of movement toward the side of the adjacent lane from the relative position of the obstacle and, if a distance between the avoiding point and a center line of the adjacent lane is greater than the width of the own vehicle, to generate an avoiding path for allowing the own vehicle to pass through the avoiding point;

a map information storage unit configured to store, about each of the travel lane and adjacent lane, a target trajectory defined from a plurality of nodes along a travel direction and links connecting adjacent ones of the nodes, and map information defined using width information along the vehicle width direction with the target trajectory serving as a center;

a travel-permitted region setting unit configured to set a first travel-permitted region, where only the own vehicle is permitted to travel, for the own vehicle with reference to the map information of the travel lane by employing a two-dimensional region defined by a length along the target trajectory in the travel lane and the width of the own vehicle in the vehicle width direction with the target trajectory in the travel lane serving as the center and, if another vehicle travels in the adjacent lane, also to set a second travel-permitted region, where only the another vehicle is permitted to travel, for the another vehicle with reference to the map information of the adjacent lane by employing a two-dimensional region defined by a length along the target trajectory in the adjacent lane and the width of the another vehicle in the vehicle width direction with the target trajectory in the adjacent lane serving as the center;

a departure existence/non-existence determination unit configured to determine whether the own vehicle may depart from the first traveling region if the own vehicle travels along the avoiding path; and a departure acceptance/rejection determination unit configured, if determined that the own vehicle may depart from the first travel-permitted region, to determine, on a basis of at least one of a position of the another vehicle and a position of the second travel-permitted region, whether to allow the own vehicle to depart from the first travel-permitted region, wherein, if the departure acceptance/rejection determination unit allows the departure, the travel-permitted region setting unit increases a width of the first travel-permitted region to a width sufficient to embrace the own vehicle traveling on the avoiding path.

2. The obstacle avoidance system according to claim 1, wherein:

if an overlapping region with the second travel-permitted region occurs when the width of the first travel-permitted region is increased, the travel-permitted region setting unit increases the width of the first travel-permitted region to a width sufficient to embrace the own vehicle traveling on the avoiding path and also decreases a width of the second travel-permitted region to avoid overlapping the first travel-permitted region after increased in width.

3. The obstacle avoidance system according to claim 2, wherein:

if the environmental sensor of the own vehicle does not detect a new obstacle different from the front obstacle while traveling on the avoiding path, the avoiding path generation unit further generates a return path for allowing the own vehicle to return from the avoiding point to the target trajectory in the travel lane.

4. The obstacle avoidance system according to claim 3, wherein:

the avoiding path generation unit determines curvatures of the avoiding path and return path so that lateral accelerations applied to the own vehicle during traveling on the avoiding path and return path do not exceed a reference lateral acceleration set for preventing the own vehicle from overturning.

5. The obstacle avoidance system according to claim 4, wherein:

when the own vehicle travels on the return path and returns to the target trajectory in the travel lane, the travel-permitted region setting unit decreases the increased width of the first travel-permitted region to the width before the increase and increases the decreased width of the second travel-permitted region to the width before the decrease.

6. The obstacle avoidance system according to claim 1, further comprising:

an obstacle information storage unit configured to store obstacle information that indicates a position of the obstacle on the travel lane and the size of the obstacle in the vehicle width direction, wherein the avoiding path generation unit generates the avoiding path with reference to the obstacle information.

7. The obstacle avoidance system according to claim 6, further comprising:

an obstacle information management unit configured to acquire detection results from the obstacle detection unit, to compare the detection results with the obstacle information stored in the obstacle information storage unit, and, if the acquired detection results of the obstacle detection unit are not included in the obstacle information, to add the detection results of the obstacle detection unit to the obstacle information storage unit.

8. An obstacle avoidance system for allowing an own vehicle, which is in a travel lane with an adjacent lane provided in parallel with the travel lane, to avoid an obstacle, which is located ahead in the travel lane, by passing the obstacle on a side of the adjacent lane, comprising:

an obstacle detection unit configured to detect, on a basis of an output from an environmental sensor mounted on the own vehicle, a relative position of the obstacle with respect to the own vehicle as a reference and a size of the obstacle in a vehicle width direction;

a movement amount calculation unit configured to calculate, on a basis of the relative position of the obstacle, the size of the obstacle in the vehicle width direction and a width of the own vehicle, a maximum amount of movement of the own vehicle in the vehicle width direction as required to avoid the obstacle;

an avoiding path generation unit configured to determine, as an avoiding point, a point displaced over the maximum amount of movement toward the side of the adjacent lane from the relative position of the obstacle and, if a distance between the avoiding point and a center line of the adjacent lane is greater than the width of the own vehicle, to generate an avoiding path for allowing the own vehicle to pass through the avoiding point;

a map information storage unit that stores the map information of the respective lanes; and a travel-permitted region setting unit configured to set a partial region of the travel lane, where the own vehicle travels, as a travel-permitted region where only the own vehicle is permitted to travel, wherein the map information is defined using a target trajectory defined from a plurality of nodes along a travel direction in each of the lanes and links connecting adjacent ones of the nodes, wherein the travel-permitted region is defined by a one-dimensional region consisting of a part of the target trajectory, and wherein the avoiding path generation unit generates the avoiding path if a distance from the avoiding point to the target trajectory in the adjacent lane is greater than the width of the own vehicle.

* * * * *